(12) United States Patent
Chelian et al.

(10) Patent No.: US 9,552,544 B1
(45) Date of Patent: Jan. 24, 2017

(54) METHOD AND APPARATUS FOR AN ACTION SELECTION SYSTEM BASED ON A COMBINATION OF NEUROMODULATORY AND PREFRONTAL CORTEX AREA MODELS

(71) Applicant: HRL Laboratories, LLC, Malibu, CA (US)

(72) Inventors: Suhas E. Chelian, Encino, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 354 days.

(21) Appl. No.: 14/334,649

(22) Filed: Jul. 17, 2014

Related U.S. Application Data

(60) Provisional application No. 61/885,641, filed on Oct. 2, 2013.

(51) Int. Cl.
*G06N 3/04* (2006.01)

(52) U.S. Cl.
CPC .................... *G06N 3/0472* (2013.01)

(58) Field of Classification Search
CPC ................ G06N 3/00–3/02; G06N 3/0472
See application file for complete search history.

(56) References Cited

U.S. PATENT DOCUMENTS

| | | | | |
|---|---|---|---|---|
| 6,769,066 B1* | 7/2004 | Botros | ............. | G06F 21/55 700/110 |
| 7,464,410 B1* | 12/2008 | Halasz | ............. | H04L 63/1416 726/22 |
| 7,487,544 B2* | 2/2009 | Schultz | ............. | G06F 21/562 713/188 |
| 8,301,770 B2* | 10/2012 | Van Coppenolle | .... | G06Q 30/06 709/225 |

(Continued)

OTHER PUBLICATIONS

A Neural Network Based System for Intrusion Detection and Classification of Attacks, by MORADI, 2004.*

(Continued)

*Primary Examiner* — Stanley K Hill
*Assistant Examiner* — Thomas Fink
(74) *Attorney, Agent, or Firm* — Tope-McKay & Associates

(57) ABSTRACT

Described is a system for action selection based on a combination of neuromodulatory and prefrontal cortex models. The system inputs group attack probability estimates for multiple groups in a prefrontal cortex (PFC) input area of a model instance. The system encodes a dispersion of the group attack probability estimates in an anterior cingulated cortex (ACC) conflict input area of the model instance, resulting in activation of the ACC conflict input area. The activation is propagated to an action area and a neuromodulatory area of the model instance. An action strategy is selected in the action area. The action strategy is implemented, and a reward and a cost is generated for the (Continued)

implemented action strategy. An assessment of possible action strategies is updated based on the generated reward and cost. Each model instance modulates its subsequent action strategy selection based on the updated assessment of the possible action strategies.

28 Claims, 10 Drawing Sheets

(56) References Cited

U.S. PATENT DOCUMENTS

| | | | | |
|---|---|---|---|---|
| 2003/0051026 | A1* | 3/2003 | Carter | H04L 12/24 709/224 |
| 2007/0239314 | A1* | 10/2007 | Kuvich | G06K 9/4628 700/245 |
| 2014/0058988 | A1* | 2/2014 | Lai | G06N 3/049 706/14 |

OTHER PUBLICATIONS

Training a Neural-Network Based Intrusion Detector to Recognize Novel Attacks, by Lee, 2001.*
Intrusion detection using hierarchical neural networks, by Zhang, 2004.*
Decisions, Decisions, Decisions. Choosing a Biological Science of Choice, by Glimcher, 2002.*
Anderson, J. R., Bothell, D., Byrne, M. D., Douglass, S., Lebiere, C., & Qin, Y . (2004). An integrated theory of the mind. Psychological Review 111, (4), 1036-1060.
Berke, J. D., Breck J. T., and H. Eichenbaum. "Striatal versus hippocampal representations during win-stay maze performance." Journal of Neurophysiology 101 (2009): 1575-1587.
Bunge, Sa, I Kahn, JD Wallis, EK Miller, and AD Wagner. "Neural circuits subserving the retrieval and maintenance of abstract rules." Journal of Neurophysioloqy 90 (2003): 3419-3428.
Chang, Q, and P. E. Gold. "Switching memory systems during learning: Changes in patterns of brain acetylcholine release in the hippocampus and striatum in rats." The Journal of Neuroscience 23 (2003): 3001-3005.
Chelian, Suhas E., Nicholas Oros, Andrew Zaldivar, Jeffrey L. Krichmar, and Rajan Bhattacharyya. "Model of the interactions between neuromodulation and prefrontal cortex during a resource allocation task." ICDL-EpiRob 2012: IEEE Conference on Development and Learning and Epigenetic Robotics. 2012.
DeCoteau, W. E., Thorn C. Gibson D. J. Courtemanche R. Mitre P. Kubota Y,. and A. M. Graybiel. "Learning-related coordination of striatal and hippocampal theta rhythms during acquisition of a procedural maze task," Proceedings of the National Academy of Sciences of the United States of America 104 (2007): 5644-5649.
Delgado, Mauricio R., and Kathryn C. Dickerson. "Reward-related learning via multiple memory systems." Biological Psychiatry 72 (2012). 134-141.
Devan, B. D., and N. M. White. "Parallel information processing in the dorsal striatum: Relation to hippocampal function." The Journal of Neuroscience 19 (1999): 2789-2798.
Eichenbaum, H. "A Brain System for Procedural Memory." the Cognitive Neuroscience of Memory: An Introduction. Chapter 10 (2002).
Farr, S. A., Uezu K. Flood J. F., and J. E. Morley. "Septohippocampal drug interactions in post-trial memory processing." Brain Research 847 (1999): 221-230.
Gengler, S., Malot H. A., and C. Hölscher. "Inactivation of the rat dorsal striatum impairs performance in spatial tasks and alters hippocampal theta in the freely moving rat." Behavioral Brain Research 164 (2005): 73-82.
Gibson, B. M., and S. J. Shettleworth. "Place versus response learning revisited: Tests of blocking on the radial maze." Behavioral Neuroscience 119 (2005): 567-586.

Haber, S., K, Kim, P. Mailly, and R Calzavara. "Reward-related cortical inputs define a large striatal region in primates that interface with associative cortical connections, proving a substrate for incentive-based learning," Journal of Neuroscience 26 (2006): 8368-8376.
Hallworth, N. E., and B. H. Bland. "Basal ganglia-hippocampal interactions support the role of the hippocampal formation in sensorimotor integration." Experimental Neurology 188 (2004): 430-443.
Huang T.-R T. E. Hazy. S. A. Herd, and R. C. O'Reilly. "Assembling old tricks for new tasks: a neural model of instruction learning and control." (2013), Journal of Cognitive Neuroscience vol. 25, No. 6, pp. 843-851.
Hubbard, E.M., M. Piazza, P. Pinel, and S. Dehaene, "Interactions between number and space in parietal cortex." Nature Reviews Neuroscience 6 (2005): 435-448.
Jung, M. W., S. I. Wiener, and B. L. McNaughton. "Comparison of spatial firing characteristics of units in dorsal and ventral hippocampus of the rat." Journal of Neuroscience 14 (1994): 7347-7356.
Krichmar, J.L. "The Neuromodulatory System—A Framework for Survival and Adaptive Behavior in a Challenging World." Adaptive Behavior 16 (2008): 385-399.
Lebedev, M., and S. Wise. "Insights into seeing and grasping: distinguishing the neural correlates of perception and action." Behav. Cogn. Neurosci 1 (2002): 108-129.
Lee, A. S., Duman R. S., and C. Pittenger. "A double dissociation revealing bidirectional competition between striatum and hippocampus during learning." Proceedings of the National Academy of Sciences 105 (2008): 17163-17168.
Matthijs, A., A. van der Meer, and A. Davd Redish. "Expectancies in decision making, reinforcement learning, and ventral striatum." Frontiers in Neuroscience 4 (2010): 29-37.
McClelland, J.L., B.L. McNaughton, and R.C. O'Reilly, "Why there are complementary learning systems in the hippocampus and neocortex: Insights from the successes and failures of connectionist models of learning and memory." Psychological Review 102 (1995): 419-457.
Muller, R. U., and J. L. Kubie. "The effects of changes in the environment on the spatial firing of hippocampal complex-spike cells." Journal of Neuroscience 7 (1987): 1951-1968.
Nadel, L. "Multple Memory Systems: A New View. Learning and Memory: A Comprehensive Reference." Oxford: Academic Press 1 (2008): 41-52.
Niculescu-Mizil, A. "Multi-armed bandits with betting—on-line learning with limited feedback," in Conference on Learning Theory, Conference on Learning Theory. 2009.
Norman, K.A., and R.C, O'Reilly, "Modeling Hippocampal and Neocortical Contributions to Recognition Memory: A Complementary Learning Systems Approach." Psychological Review 110 (2003): 611-646.
O'Keefe, J., and J. Dostrovsky. "The hippocampus as a spatial map: Preliminary evidence from unit activity in the freely-moving rat." Brain Research 34 (1971): 171-175.
Packard, M. G, and B. J. Knowlton. "Learning and memory functions of the basal ganglia." Annual Review of Neuroscience 25 (2002): 563-593.
Packard, M. G. "Glutamate infused posttraining into the hippocampus or caudate-putamen differentially strengthens place and response learning." Proceedings of the National Academy of Sciences of the United States of America, 96 (1999), 12881-12886.
Packard, M. G., and J. L. McGaugh. "Inactivation of hippocampus or caudate nucleus with lidocaine differentially affects expression of place and response learning," Neurobiology of Learning and Memory 65 (1996): 65-72.
Peters, Jan, and Christian Buchel. "Episodic Future Thinking Reduces Reward Delay Discounting through an Enhancement of Prefrontal-Mediotemporal Interactions." Neuron 66 (2010): 138-148.
Pouget, Alexandre, Peter Dayan, and Richard Zemel. "Information processing with population codes." Nature Reviews Neuroscience 1 (2000): 125-132.

(56) References Cited

OTHER PUBLICATIONS

Ragozzino, M. E. "Dynamic changes in acetylcholine output in the medial striatum during place reversal learning." Learning & Memory 11 (2004): 70-77.
Sakagami, M., X. Pan, and B. Uttl. "Behavioral inhibition and prefrontal cortex in decision-making." Naural Networks 19 (2006): 1255-1265.
Samsonovich, A. V., and G. A. Ascoli. "A simple neural network model of the hippocampus suggesting its pathfindng role in episodic memory retrieval." Learn Mem 12, No. 2 (2005): 193-208.
Schmitzer-Torbert, N. "Place and response learning in human virtual navigation: Behavioral measures and gender differences." Behavioral Neuroscience 121 (2007): 277-290.
Sehacter, Daniel L., C.-Y. Peter Chiu, and Kevin N. Ochsner, "Implicit Memory: A Selective Review." Annu. Rev. Neurosci 6 (1993): 159-182.
Shor, O.L., Fidzinski P., and J. Behr. "Muscarinic acetylcholine receptors and voltage-gated calcium channels contribute to bidirectional synaptic plasticity at CA1-subiculum synapses." Neuroscience Letters 449 (2009):220-223.
Squire, L.R. "Memory systems of the brain: a brief history and current perspective." Neurobiol Learn Mem. 82 (2004): 171-177.
Taube, J. S., R. U, Muller, and J. B., Jr. Ranck. "Head-direction cells recorded from the postsubiculum in freely moving rats: Effects of environmental manipulations." J Neuroscience 10 (1990): 436-447.
Tolman, E. C. "Cognitive maps in rats and men." Psychological Review 55 (1948): 189-208.
Tolman, E. C. "The determiners of behavior at choice point." Psychological Review 45 (1938): 1-41.
Tudusciuc, O., and A. Nieder. "Contributions of primate prefontal and posterior parietal cortices to length and numerosity representation." J Neurophysiol 6 (2009): 2984-2994.
van der Meer, M., Z. Kurth-Nelson, and AD Redish. "Information processing in decision-making systems." Neuroscientist 18 (2012): 342-359.
Vanni-Mercier, and et al. "The Hippocampus Codes the Uncertainty of Cue-Outcome Associations: An Intracranial Electrophysiological Study in Humans." J Neuroscience 29(2009): 5267-5294.
Wimmer, G. Elliott, and Daphne Shohamy. "Preference by Association: How Memory Mechanisms in the Hippocampus Bias Decisions." Science 338 (2012): 270-273.
Yin, H. H. "Contributions of striatal subregions to place and response learning." Learning & Memory 11 (2004): 459-463.
Howard, M.D., Bhattacharyya, R., Chelian, S.E., Phillips, M.E., Pilly, P.K., Sun, Y., Wang, H., & Ziegler, M.D. (2015). The neural basis of decision-making during sensemaking: implications for human-system interaction. In Proceedings of 2015 IEEE Aerospace Conference, Big Sky, USA.
Graf, P., & Schacter, D. L. (1985). Implicit and explicit memory for new associations in normal and amnesic subjects. Journal of Experimental Psychology: Learning, Memory, and Cognition, 11, 501-518.
Andrew M. Nuxoll and John E. Laird. Extending Cognitive Architecture with Episodic Memory. In the Proceedings of the 21st National Conference on Artificial Intelligence (AAAI), 2007.
J. Krichmar, "The neuromodulatory system—a framework for survival and adaptive behavior in a challenging world," Adaptive Behavior, vol. 18, No. 6, pp. 385-399, Dec. 2008.
W. Schultz., "Dopamine neurons and their role in reward mechanisms," Curr. Opin. Neurobiol., vol. 7, No. 2, pp. 191-197, Apr. 1997.
K. Berridge, "Motivation concepts in behavioral neuroscience," Physiol. Behav., vol. 81, No. 2, pp. 179-209, Apr. 2004.
M. Millan, "The Neurobiology and Control of anxious states," Prog. Neurobiol., vol. 70, No. 2, pp. 83-244, Jun. 2003.
M. Crockett, L. Clark, G. Tabibnia, M. Lieberman, and T. Robbins, "Serotonin modulated behavioral reactions to unfairness," Science, vol. 320, No. 5884, p. 1739, Jun. 2008.

A. Chiba, D. Bucci, P. Holland, and M. Gallagher, "Basal forebrain cholinergic lesions disrupt increments but not decrements in conditioned stimulus processing," J. Neurosci., vol. 15, No. 11, pp. 7315-7322, Nov. 1995.
M. Baxter, P. Holland, and M. Gallagher, "Disruption of decrements in conditioned stimulus processing by selective removal of hippocampal cholinergic input," J. Neurosci., vol. 17, No. 13, pp. 5230-5236, Jul. 1997.
R. Ross, J. McGaughy, and H. Eichenbaum, "Acetylcholine in the orbitofrontal cortex is necessary for the acquisition of a socially transmitted food preference," Learn. Mem., vol. 12, No. 3, pp. 302-306, May 2005.
M. Rushworth, T. Behrens, P. Rudebeck, and M. Walton, "Contrasting roles for cingulated and orbitofrontal cortex in decisions and social behavior," Trends in Cog. Sci., vol. 11, No. 4, pp. 168-176, Apr. 2007.
A. Zaldivar, D. Asher, and J Krichmar, "Simulation of how neuromodulation influences cooperateive behavior," in Simulation of Adaptive Behavior: From Animals to Animats. Lecture Notes on Artificial Intelligence. Berlin, Germany, Springer-Verlag. 2010, pp. 649-660.
A. Niculescu-Mizil, "Multi-armed bandits with betting—on-line learning with limited feedback," in Conference on Learning Theory, Montreal, 2009.
R. Cools, K. Nakamura, and N. Daw, "Serotonin and dopamine: unifying affective, activational, and decision functions,"Neuropsychopharm., vol. 36, No. 1, pp. 98-113, Jan. 2011.
F. Denk et al., "Differential involvement of serotonin and dopamine systems in cost-benefit decisions about delay or effort," Psychopharm. vol. 179, No. 3, pp. 587-596, Dec. 2005.
P. Roussos, S. Giakoumaki, S. Pavlakis, and P. Bitsios, "Planning, decision-making and the COMT re4818 polymorphism in healthy males," Neuropsychologia, vol. 46, No. 2, pp. 757-763, Oct. 2008.
W. Alexander and J. Brown, "Computational models of performance monitoring and cognitive control," Topics in Cognitive Sci., vol. 2, No. 4, pp. 658-677, Apr. 2010.
M. Botvinick, T. Braver, D. Barch, C. Carter, J. Cohen, "Conflict monitoring and cognitive control," Psychological Rev., vol. 108, No. 3, pp. 624-665, Jul. 2001.
M. Sakagami, X. Pan and B. Uttl, "Behavioral inhibition and prefrontal cortex in decision-making," Neural Networks, vol. 19, No. 8, pp. 1255-1265, Sep. 2006.
M. Lebedev. and S. Wise, "Insights into seeing and grasping: distinguishing the neural correlates of perception and action," Behav. Cogn. Neurosci. Rev., vol. 1, No. 2, pp. 108-129, Jun. 2002.
S. Haber, K. Kim, P. Mailly, R. Calzavara, "Reward-related cortical inputs define a large striatal region in primates that interface with associative cortical connections, proving a substrate for incentive-based learning," J. Neurosci., vol. 26, No. 32, pp. 8368-8376, Aug. 2006.
T, Robbins and A. Roberts, "Differential regulation of front-executive function by the monoamines and acetylcholine," Cerebral Cortex, vol. 17, no. supplement 1, pp. i151-i160, Sep. 2007.
J. Alcaraz and C. Maroto, "A robust genetic algorithm for resource allocation in project scheduling," Annals of Operations Res., vol. 102, No. 1, pp. 83-109, Feb. 2001.
A. Litt, C. Eliasmith, P. Thagard, "Neural affective decision theory: choices, brains, and emotions," Cognitive Systems Res., vol. 9, No. 4, pp. 252-273, Oct. 2008.
G. Loewenstein, S. Rick, and J. Cohen, "Neuroeconomics," Annu. Rev. Psychol., vol. 59, No. 1, pp. 647-672, Jan. 2008.
C. Breitenstein et al., "Tonic dopaminergic stimulation impairs associative learning in healthy subjects," Neuropsychopharm., vol. 31, No. 11, pp. 2552-2564, Jul. 2006.
G. Aston-Jones G and J. Cohen, "An integrative theory of locus coeruleus-norepinephrine function: adaptive gain and optimal performance," Annu. Rev. Neurosci., vol. 28, No. 1, pp. 403-450, Jul. 2008.
A. Dombrovski et al., "Reward/punishment reversal learning in older suicide attempters," Am. J. Psychiatry., vol. 167, No. 6, pp. 699-707, Jun. 2010.

(56) References Cited

OTHER PUBLICATIONS

F. Jollant et al., "Impaired decision making in suicide attempters," Am. J. Psychiatry., vol. 162, No. 2, pp. 304-310, Feb. 2005.
A. Bechara, A., Domásio, H. Domásio, S. Anderson, "Insensitivity to future consequences following damage to human prefrontal cortex," Cognition, vol. 50, No. 1-3, pp. 7-15, Apr.-Jun. 1994.
H. Markram and M. Tsodyks, "Redistribution of synaptic efficacy between neocortical pyramidal neurons," Nature, vol. 382, No. 6594, pp. 807-810, Aug. 1996.
Gail A Carpenter and W. Ross. Art-emap: A neural network architecture for learning and prediction by evidence accumulation. IEEE Transactions on Neural Networks, 6(4):805-818, Jul. 1995.
Peter Redgrave Basal ganglia. Scholarpedia, 2(6):1625, 2007.
Charles S Carver and Teri L. White Behavioral inhibition, behavioral activation, and affective responses to impending reward and punishment: The BIS/BAS scales. Journal of personality and social psychology, 67(2), pp. 319-333, 1994.
Suhas E Chelian, Nicholas Oros, Andrew Zaldivar, Jeffrey L. Krichmar, and Rajan Bhattacharyya. Model of the interactions between neuromodulators and prefrontal cortex during a resource allocation task. In Development and Learning and Epigenetic Robotics (ICDL), 2012 IEEE International Conference on, pp. 1-6, IEEE, 2012.
Ido Erev and Greg Barron. On adaptation, maximization, and reinforcement learning among cognitive strategies. Psychological review, 112(4), pp. 912-931, 2005.
Daniel Kahneman and Amos Tversky, Choices, values, and frames. American psychologist, 39(4), pp. 341-350, 1984.
Donald Laming. Choice reaction performance following an error. Acta Psychologica, 43(3), pp. 199-224, 1979.
Michael D Lee, Shunan Zhang, Miles Munro, and Mark Steyvers. Psychological models of human and optimal performance in bandit problmes. Cognitive Systems Research, 12(2), pp. 164-174, 2011.
A. Niculescu-Mizil, Multi-armed bandits with betting—on-line learning with limited feedback. In Conference on Learning Theory, Montreal, 2009, pp. 1-4.
N. Oros, A. Chiba, D. Nitz, M., Avery, and J. Krichmar. Simulation of the neuromodulatory pathways responsible for incrementing and decrementing attention during reversal learning and set-shifting. In Proceeding of the Society for Neuroscience, Washington, D.C., 2011—abstract
N. Oros, A. Chiba, D. Nitz, M. Avery, and J. Krichmar. Simulation of the neuromodulatory pathways responsible for incrementing and decrementing attention during reversal learning and set-shifting. In Proceeding of the Society for Neuroscience, Washington, D.C., 2001—graphic.
Heuer, R. J. (1999). Psychology of intelligence analysis. Center for the Study of Intelligence, CIA, Chapter 9.
Heuer, R. J. (1999). Psychology of intelligence analysis. Center for the Study of Intelligence, CIA, Chapter 10.
Heuer, R. J. (1999). Psychology of intelligence analysis. Center for the Study of Intelligence, CIA, Chapter 11.
Heuer, R. J. (1999). Psychology of intelligence analysis. Center for the Study of Intelligence, CIA, Chapter 12.
9E. Heuer, R. J. (1999). Psychology od intelligence analysis. Center for the Study of Intelligence, CIA, Chapter 13.
Roger Ratcliff, Daniel Spieler, and Gail Mckoon. Explicitly modeling the effects of aging on response time Psychonomic Bulletin & Review, 7(1), pp. 1-25, 2000.
Peter H Rudebeck, Mark E Walton, Angharad N Smyth, David M Bannerman, and Matthew FS Rushworth. Seperate neural pathways process different decision costs. Nature neuroscience, 9(9), pp. 1161-1168, 2006.
MFS Rushworth, TEJ Behrens, PH Rudebeck, and ME Walton. Constrasting roles for cingulate and orbitofrontal cortex in decisions and social behaviour. Trends in Cognitive sciences, 11(4), pp. 168-176, 2007.
Russell, S. and Norvig. P. (2003), "Artificial Intelligence: A modern approach," Upper Saddle River: Prentice-Hall, Chapter 21.
Andrew Zaldivar, Derrik E Asher, and Jeffrey L Krichmar. Simulation of how neuromodulation influences cooperative behavior. In From Animals to Animals 11, pp. 649-660, Springer, 2010.
A. Bechara, A., Damásio, S. Anderson, "Insensitivity to future consequences following damage to human prefrontal cortex," Congnition, vol. 50, No. 1-3, pp. 7-15, Apr.-Jun. 1994.
Lebiere, C., Pirolli, P., Thomson, R., Paik, J., Rutledge-Taylor, M., Staszewski, J. & Anderson, J. R. "A functional model of sensmaking in a neurocognitive architecture", Computational intelligence and neuroscience 2013, 5, pp. 1-29.
Randy L Haupt and Sue Ellen Haupt. Practical genetic algorithms. John Wiley & Sons, 2004, Chapter 2.
P. Rudebeck, M. Walton, A. Smyth, D. Bannerman, and M. Rushworth, "Separate neural pathways process different lecision costs," Nature Neurosci., vol. 9, No. 9, pp. 1161-1168, Aug. 2006.
N. Oros, A. Chiba, D. Nitz, M. Avery, and J. Krichmar, "Simulation of the neuromodulatory pathways responsible for incrementing and decrementing attention during reversal learning and set-shifting," In Proceeding of the Society for Neuroscience, Washington, D.C., 2011.

\* cited by examiner

Synaptic Connections Between Neural Areas

| ROW | FROM 202 | TO 204 | PLASTICITY 206 | PHASIC NEUROMODULATION 208 |
|---|---|---|---|---|
| *Input* | | | | |
| 1 | ACC Conflict | OFC | Reward-VTA | N |
| 2 | | ACC | Cost-RN | N |
| 3 | | VTA | Reward-VTA | N |
| 4 | | RN | Cost-RN | N |
| *Action* | | | | |
| 5 | OFC | DLPFC | Reward-VTA | N |
| 6 | | $OFC^C$ | N/A | Y, BF.SI sharpens |
| 7 | | BF.SI | Reward-VTA$^{STP}$ | N |
| 8 | ACC | $DLPFC^J$ | Cost-RN | N |
| 9 | | $ACC^C$ | N/A | Y, BF.MS flattens |
| 10 | | BF.MS | Cost-RN$^{STP}$ | N |

FIG. 2

| Parameter | Value | Notes (e.g., equation reference) |
|---|---|---|
| α for PM+ | 2. | (2) |
| α for PM− | 0.5 | (2) |
| $\rho_i$ | 0.001 | (3) |
| $\tau$ | 0.25 | (3) |
| Mean for initial weights | 0.25 | (4) |
| Standard deviation for initial weights | 0.0625 | (4) |
| $r$ | 0.05 | (5) |
| $d$ | 0.1 | (5) |
| $\eta$ | 0.25 | (6) |
| Threshold for sharpening in OFC | 0.66 | N/A |
| Threshold for flattening in ACC | 0.66 | N/A |
| α for sharpening in OFC | 2. | (2) |
| α for flattening in ACC | 0.75 | (2) |
| α for competition in DLPFC | 100. | (2) |

| CONDITION | OFC | ACC | BF.MS | BF.SI |
|---|---|---|---|---|
| Control | N | N | N | N |
| OFC Lesion | Y | N | N | N |
| ACC Lesion | N | Y | N | N |
| BF.MS Lesion | N | N | Y | N |
| BF.SI Lesion | N | N | N | Y |

|  | Accurate | Inaccurate |
|---|---|---|
| Control | 74% (37%) | 46% (17%) |
| OFC Lesion | 38% (49%)* | 27% (23%)* |
| ACC Lesion | 89% (11%)* | 51% (15%) |
| BF.MS Lesion | 67% (32%) | 44% (16%) |
| BF.SI Lesion | 66% (37%) | 50% (14%) |

METHOD AND APPARATUS FOR AN ACTION SELECTION SYSTEM BASED ON A COMBINATION OF NEUROMODULATORY AND PREFRONTAL CORTEX AREA MODELS

GOVERNMENT LICENSE RIGHTS

This invention was made with government support under U.S. Government Contract Number D10PC20021 ICArUS-MINDS. The government has certain rights in the invention.

CROSS-REFERENCE TO RELATED APPLICATIONS

This is a Non-Provisional patent application of U.S. Provisional Application No. 61/885,641, filed in the United States on Oct. 2, 2013, entitled, "Method and Apparatus for an Action Selection System Based on a Combination of Neuromodulatory and Prefrontal Cortex Area Models."

BACKGROUND OF THE INVENTION (1) Field of Invention

The present invention relates to a bio-inspired system for action selection and, more particularly, to a bio-inspired system for action selection based on a model of the interactions between neuromodulators and prefrontal cortex.

(2) Description of Related Art

Neuromodulators such as dopamine (DA), serotonin (5-HT), and acetylcholine (ACh) affect both short- and long-term dynamics of neural circuits that represent reward, cost, and attention in that order (see the List of Incorporated Cited Literature References, Literature Reference No. 1). Recent experiments suggest that the reward and cost of actions are also partially represented in the orbitofrontal cortex (OFC) and the anterior cingulate cortex (ACC), respectively (see Literature Reference Nos. 9 and 10).

Reinforcement learning and evolutionary algorithms have also been used to model resource allocation tasks (see Literature Reference Nos. 13 and 24) and, hence, action selection, in general. However, these models do not have a high degree of neurofidelity and, therefore, cannot make predictions of animal behavior based on lesion studies or neurotransmitter imbalances. Litt et al. (see Literature Reference No. 25) seeks to model prospect theory and decision affect theory using brain regions such as OFC, ACC, and dopaminergic and serotoninergic areas. Their model, however, does not model acetylcholinergic influences and has only been demonstrated on binary decisions. Previous models of action selection with neuromodulatory systems have not extensively considered prefrontal contributions or acetylcholinergic influences to action selection (see Literature Reference Nos. 11 and 12).

Each of the prior methods described above exhibits limitations that make them incomplete. Thus, a continuing need exists for a method that captures both short- and long-term dynamics in action selection based on a combination of neuromodulatory and prefrontal cortex area models.

SUMMARY OF THE INVENTION

The present invention relates to a bio-inspired system for action selection and, more particularly, to a bio-inspired system for action selection based on a model of the interactions between neuromodulators and prefrontal cortex. The system comprises one or more processors and a memory having instructions such that when the instructions are executed, the one or more processors perform multiple operations. The system generates a model instance of a neural model having an action area module and a neuromodulatory area module. A set of group attack probability estimates for a plurality of groups are input in a prefrontal cortex (PFC) input area module of the model instance. The system encodes, in an anterior cingulate cortex (ACC) conflict input area module of the model instance, a spread or dispersion of the group attack probability estimates, resulting in an activation of the ACC conflict input area module. The system propagates the activation of the ACC conflict input area module to the action area module of the model instance and the neuromodulatory area module of the model instance. An action strategy is selected in the action area module of the model instance, and the action strategy is implemented. A reward and a cost for the implemented action strategy are generated, and an assessment of possible action strategies is updated based on the generated reward and cost for the implemented action strategy. Each model instance of the neural model modulates its subsequent action strategy selection based on the updated assessment of the possible action strategies.

In another aspect, the system encodes the spread or dispersion of group attack probability estimates according to the following:

$$h = -\frac{1}{\log_2 N} \sum_i p_i \log_2 p_i,$$

where h represents normalized entropy, $p_i$ is a group attack probability estimate for group i, and N is the total number of groups.

In another aspect, the propagation of the activation of the ACC conflict input area module to the action area module of the model instance and the neuromodulatory area module of the model instance is governed by synaptic weights.

In another aspect, the selection of an action strategy in the action area module of the model instance is based on a product of a set of long-terms weights from the ACC conflict input area module and a set of short-term effects from the neuromodulatory area module of the model instance.

In another aspect, the action strategy is implemented using the Power Rule according to the following:

$$y_i = x_i^\alpha / \Sigma_i x_i^\alpha,$$

where $y_i$ is a set of troop units assigned for group i, $x_i$ represents group attack probability estimates for group i, and $\alpha$ is a parameter, such that when $\alpha$ is greater than 1, an aggressive strategy is implemented, and when $\alpha$ is less than 1, a conservative strategy is implemented.

In another aspect, the system generates the reward as a percent of resources assigned to a true attacking group, and generates the cost as a percent of resources not assigned to the true attacking group.

In another aspect, each model instance modulates its subsequent action strategy selection to prefer a more aggressive action strategy when the set of group attack probability estimates are accurate, and wherein each model instance modulates its subsequent action strategy selection to prefer a less aggressive action strategy when the set of group attack probability estimates are inaccurate.

In another aspect, the action area module of the model instance comprises an orbitofrontal cortex (OFC) neuron module, an ACC neuron module, and a dorsolateral PFC (DLPFC) module, wherein the OFC neuron module and the ACC neuron module each encode different action strategies having different levels of aggressiveness, and wherein the OFC neuron module and the ACC neuron module project to the DLPFC module where the action strategy is selected.

In another aspect, the neuromodulatory area module of the model instance comprises a ventral tegmental neuron module (VTA), a raphe nucleus (RN) neuron module, a basal forebrain substantia innominata (BF.SI) neuron module, and a basal forebrain medial septum (BF.MS) neuron module, wherein these modules encode reward, cost, decremental attention, and incremental attention, respectively.

In another aspect, the present invention comprises an autonomous robot comprising a plurality of actuators for implementing an action and one or more processors and a non-transitory memory having instructions encoded thereon such that when the instructions are executed, the one or more processors perform a plurality of operations. The plurality of operations comprise generating a model instance of a neural model having an action area module and a neuromodulatory area module; inputting, in a prefrontal cortex (PFC) input area module of the model instance, a set of group attack probability estimates for a plurality of groups; encoding, in an anterior cingulate cortex (ACC) conflict input area module of the model instance, a spread or dispersion of the group attack probability estimates, resulting in an activation of the ACC conflict input area module; propagating the activation of the ACC conflict input area module to the action area module of the model instance and the neuromodulatory area module of the model instance; selecting an action strategy in the action area module of the model instance; implementing of the action strategy by the autonomous robot; generating a reward and a cost for the implemented action strategy; and updating an assessment of possible action strategies based on the generated reward and cost for the implemented action strategy; wherein each model instance of the neural model modulates its subsequent action strategy selection based on the updated assessment of the possible action strategies.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2 is a table of synaptic connections between neural area modules of the neural model according to the principles of the present invention;

FIG. 3 is a table of parameter values according to the principles of the present invention;

FIG. 5 is a table of results from selective lesions being performed on the neuromodulatory and action area modules of the neural model according to the principles of the present invention;

FIG. 6 is a table of mean percentage PM+ choices across all trials and all simulated agents according to the principles of the present invention;

DETAILED DESCRIPTION

Figure 1:
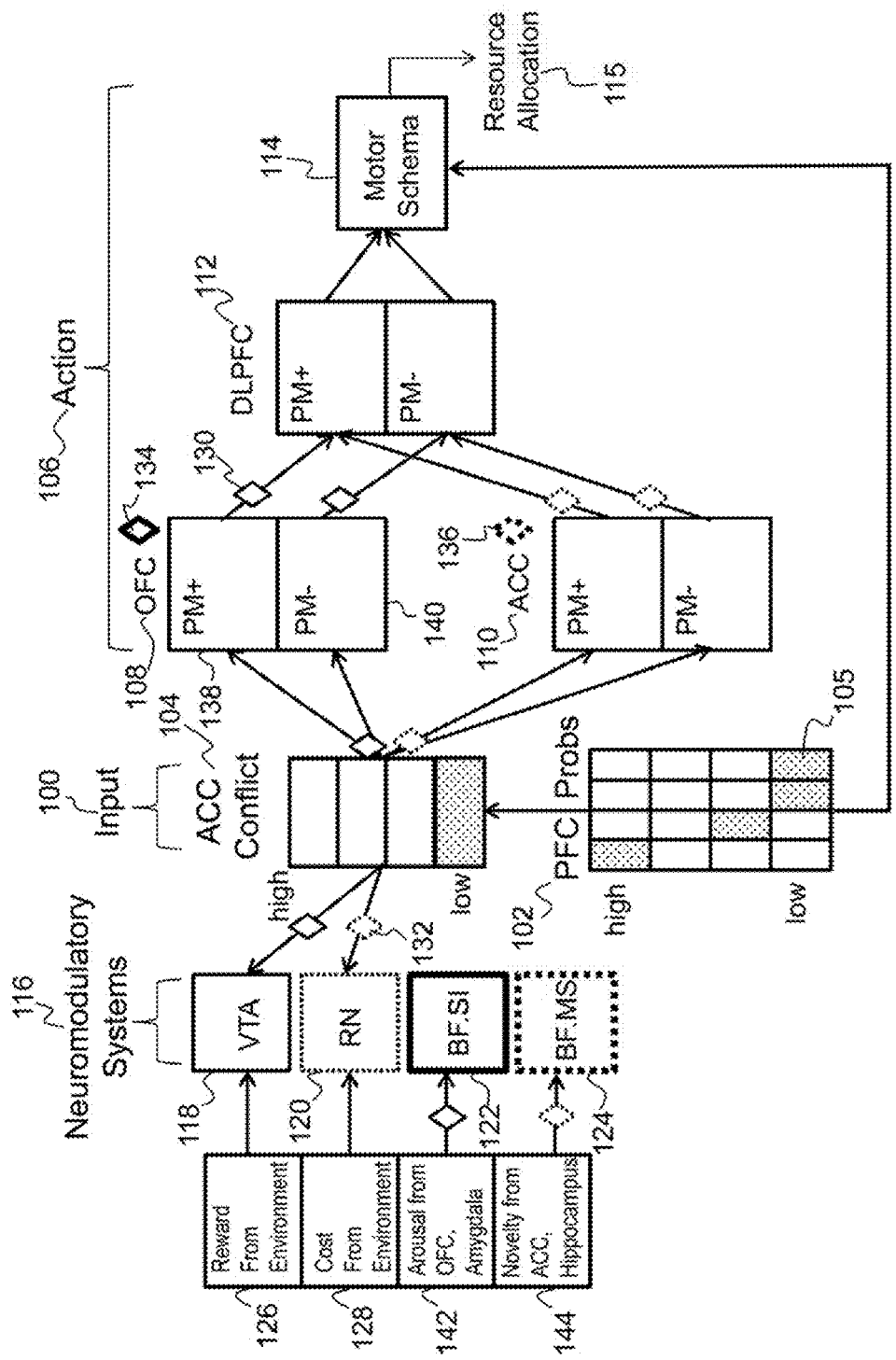
FIG. 1 is an illustration of the architecture of the neural model according to the principles of the present invention.

The present invention relates to a bio-inspired system for action selection and, more particularly, to a bio-inspired system for action selection based on a model of the interactions between neuromodulators and prefrontal cortex. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. J. Krichmar, "The neuromodulatory system—a framework for survival and adaptive behavior in a challenging world," Adaptive Behavior, vol. 16, no. 6, pp. 385-399, December 2008.
2. W. Schultz, "Dopamine neurons and their role in reward mechanisms," Curr. Opin. NeurobioL, vol. 7, no. 2, pp. 191-197, April 1997.
3. K. Berridge, "Motivation concepts in behavioral neuroscience," Physiol. Behav., vol. 81, no. 2, pp. 179-209, April 2004.
4. M. Millan, "The neurobiology and control of anxious states," Prog. Neurobiol., vol. 70, no. 2, pp. 83-244, June 2003.
5. M. Crockett, L. Clark, G. Tabibnia, M. Lieberman, and T. Robbins, "Serotonin modulates behavioral reactions to unfairness," Science, vol. 320, no. 5884, p. 1739, June 2008.
6. A. Chiba, D. Bucci, P. Holland, and M. Gallagher, "Basal forebrain cholinergic lesions disrupt increments but not decrements in conditioned stimulus processing," J. Neurosci., vol. 15, no. 11, pp. 7315-7322, November 1995.
7. M. Baxter, P. Holland, and M. Gallagher, "Disruption of decrements in conditioned stimulus processing by selective removal of hippocampal cholinergic input," J. Neurosci., vol. 17, no. 13, pp. 5230-5236, July 1997.
8. R. Ross, J. McGaughy, and H. Eichenbaum, "Acetylcholine in the orbitofrontal cortex is necessary for the acquisition of a socially transmitted food preference," Learn. Mem., vol. 12, no. 3, pp. 302-306, May 2005.
9. P. Rudebeck, M. Walton, A. Smyth, D. Bannerman, and M. Rushworth, "Separate neural pathways process different decision costs," Nature Neurosci., vol. 9, no. 9, pp. 1161-1168, August 2006.
10. M. Rushworth, T. Behrens, P. Rudebeck, and M. Walton, "Contrasting roles for cingulated and orbitofrontal cortex in decisions and social behavior," Trends in Cog. Sci., vol. 1, no. 4, pp. 168-176, April 2007.
11. N. Oros, A. Chiba, D. Nitz, M. Avery, and J. Krichmar, "Simulation of the neuromodulatory pathways responsible for incrementing and decrementing attention during reversal learning and set-shifting," In Proceeding of the Society for Neuroscience, Washington, D.C., 2011.
12. A. Zaldivar, D. Asher, and J. Krichmar, "Simulation of how neuromodulation influences cooperative behavior," in Simulation of Adaptive Behavior: From Animals to Animats, Lecture Notes on Artificial Intelligence. Berlin, Germany, Springer-Verlag, 2010, pp. 649-660.
13. A. Niculescu-Mizil, "Multi-armed bandits with betting—on-line learning with limited feedback," in Conference on Learning Theory, Montreal, 2009.
14. R. Cools, K. Nakamura, and N. Daw, "Serotonin and dopamine: unifying affective, activational, and decision functions," Neuropsychopharm., vol. 36, no. 1, pp. 98-113, January 2011.
15. F. Denk et al., "Differential involvement of serotonin and dopamine systems in cost-benefit decisions about delay or effort." Psychopharm. vol. 179, no. 3, pp. 587-596, December 2005.
16. P. Roussos, S. Giakoumaki, S. Pavlakis, and P. Bitsios, "Planning, decision-making and the COMT rs4818 polymorphism in healthy males," Neuropsychologia. vol. 46, no. 2, pp. 757-763, October 2008.
17. W. Alexander and J. Brown, "Computational models of performance monitoring and cognitive control," Topics in Cognitive Sci., vol. 2, no. 4, pp. 658-677, April 2010.
18. M. Botvinick, T. Braver, D. Barch, C. Carter, J. Cohen, "Conflict monitoring and cognitive control," Psychological Rev., vol. 108, no. 3, pp. 624-65, July 2001.
19. M. Sakagami, X. Pan and B. Uttl, "Behavioral inhibition and prefrontal cortex in decision-making," Neural Networks, vol. 19, no. 8, pp. 1255-1265, September 2006.
20. M. Lebedev, and S. Wise, "Insights into seeing and grasping: distinguishing the neural correlates of perception and action," Behav. Cogn. Neurosci. Rev., vol. 1, no. 2, pp. 108-129, June 2002.
21. S. Haber, K. Kim, P. Mailly, R. Calzavara, "Reward-related cortical inputs define a large striatal region in primates that interface with associative cortical connections, proving a substrate for incentive-based learning," J. Neurosci., vol. 26, no. 32, pp. 8368-8376, August 2006.
22. T. Robbins and A. Roberts, "Differential regulation of front-executive function by the monoamines and acetylcholine," Cerebral Cortex, vol. 17, no. supplement 1, pp. i151-i160, September 2007.
23. J. Alcaraz and C. Maroto, "A robust genetic algorithm for resource allocation in project scheduling," Annals of Operations Res., vol. 102, no. 1, pp. 83-109, February 2001.
24. A. Litt, C. Eliasmith, P. Thagard, "Neural affective decision theory: choices, brains, and emotions," Cognitive Systems Res., vol. 9, no. 4, pp. 252-273, October 2008.
25. G. Loewenstein, S. Rick, and J. Cohen, "Neuroeconomics," Annu. Rev. Psychol., vol. 59, no. 1, pp. 647-672, January 2008.
26. C. Breitenstein et al., "Tonic dopaminergic stimulation impairs associative learning in healthy subjects," Neuropsychopharm., vol. 31, no. 11, pp. 2552-2564, July 2006.
27. G. Aston-Jones G and J. Cohen, "An integrative theory of locus coeruleus-norepinephrine function: adaptive gain and optimal performance," Annu. Rev. Neurosci., vol. 28, no. 1, pp. 403-450, July 2008.
28. A. Dombrovski et al., "Reward/punishment reversal learning in older suicide attempters," Am. J. Psychiatry., vol. 167, no. 6, pp. 699-707, June 2010.
29. F. Jollant et al., "Impaired decision making in suicide attempters," Am. J. Psychiatry., vol. 162, no. 2, pp. 304-310, February 2005.
30. A. Bechara, A., Damisio, H. Damisio, S. Anderson, "Insensitivity to future consequences following damage to human prefrontal cortex," Cognition, vol. 50, no. 1-3, pp. 7-15, April-June 1994.

31. H. Markram and M. Tsodyks, "Redistribution of synaptic efficacy between neocortical pyramidal neurons," Nature, vol. 382, no. 6594, pp. 807-810, August 1996.
32. Gail A. Carpenter and W. Ross. Art-emap: A neural network architecture for learning and prediction by evidence accumulation. IEEE Transactions on Neural Networks, 6(4):805-818, July 1995.
33. Peter Redgrave. Basal ganglia. Scholarpedia, 2(6):1825, 2007.

(2) Principal Aspects

The present invention has three "principal" aspects. The first is a bio-inspired system for action selection. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a bio-inspired method for action selection. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

Neuromodulators, such as dopamine (DA), serotonin (5-HT), and acetylcholine (ACh) affect both short- and long-term dynamics of neural circuits that represent reward, cost, and attention in that order (see Literature Reference No. 1).

The ventral tegmental area (VTA) and the substantia nigra (SN) are the source of dopamine, which is related to expected reward, and incentive salience or "wanting" (see Literature Reference Nos. 2 and 3). The raphe nucleus (RN) is the source of serotonin, which is linked to cognitive control of stress, social interactions, and risk taking behavior (see Literature Reference Nos. 4 and 5).

The basal forebrain is the source of acetylcholine, and appears to modulate attention and optimize information processing. Experiments conducted by Chiba et al. (see Literature Reference No. 6) and Baxter et al. (see Literature Reference No. 7) showed that the basal forebrain has specific and separate pathways for decrementing and incrementing attention: 1) ACh projections from the medial septum/vertical limb of the diagonal band (BF.MS) to the hippocampus and medial prefrontal cortex were crucial to reduce attention to irrelevant stimuli (medial prefrontal cortex includes anterior cingulate cortex, ACC); and 2) ACh projections from the substantia innominatainucleus basalis region (BF.SI) to the amygdala and neocortex were necessary to increase attention to relevant stimuli. Ross et al. (see Literature Reference No. 8) have also shown that depletion of ACh in orbitofrontal cortex (OFC) impairs associative learning tasks.

Recent experiments suggest that the reward and cost of actions are also partially represented in OFC and ACC, respectively (e.g., see Literature Reference Nos. 9 and 10). Rudebeck et al. (see Literature Reference No. 9), for example, trained rats to choose maze arms that yielded more food pellets either after a delay (first case) or after scaling a barrier (second case). In the first case, a rat with an impaired ability to differentiate between reward magnitudes would be more likely to choose the lower (immediate) reward than the higher (deferred) reward. Such behavior was demonstrated with OFC lesions. ACC lesions, on the other hand, caused rats to more often pick lower (less effortful) rewards than higher (more effortful) rewards in the second case.

According to the principles of the present invention, previous models of neuromodulatory influences on action selection (see Literature Reference Nos. 11 and 12) were expanded to a resource allocation task while including consideration of prefrontal contributions and acetylcholinergic influences. Based on its successes, the model, which will be described in detail below, modulates its aggressiveness to the environment. Learning and performance in strategy selection from neuromodulatory and prefrontal cortical areas were also affected by selective lesioning.

(4) Specific Details (4.1) Resource Allocation Task

Simulated agents (i.e., model instances) played a variant of the multi-arm bandit game with betting (see Literature Reference No. 13) adapted to a resource allocation task (e.g., N-armed betting with bandit). In probability theory, the multi-armed bandit problem (sometimes called the K- or N-armed bandit problem) is the problem a gambler faces at a row of slot machines, sometimes known as "one-armed bandits", when deciding which machines to play, how many times to play each machine and in which order to play them. In the present invention, the variant involves the task of simulating a military planner's decisions to defend against an attack. Specifically, given attack probability estimates for four groups, agents must assign troops to defend against these groups. Thus, each trial "bets" troop units across four bandit arms.

Intuitively, one would assign more troops to groups that are more likely to attack. This is known as probability matching. For example, if the agent believes groups A, B, C, and D are likely to attack with probabilities of 80%, 10%, 5%, and 5% respectively, probability matching (PM) would assign 100 troops in the following manner: 80 to group A, 10 to group B, and 5 to both group C and D (assuming the marginal utility of each troop unit is constant). A more aggressive strategy, hereinafter referred to as PM+, would assign more resources to groups which are more likely to attack (e.g., a troop allocation of 90, 10, 0, and 0 given the previous group attack probability estimates). Conversely, a more conservative strategy, hereinafter referred to as PM-, would reserve troops to groups which are less likely to attack (e.g., a troop allocation of 70, 14, 8, 8 for the same group attack probability estimates).

After assigning resources to the four groups (A, B, C, D), agents were directly rewarded by the number of troops they assigned to the actual attack perpetrator. For example, if group A was the true attacker, then PM+(PM-) would be rewarded with a score of 90 (70). The cost would be the number of troops allocated to groups other than A: 10 for PM+, and 30 for PM- (14+8+8). However, if group B was the attacker, the reward of PM− exceeds that of PM+ (14>10). Experimental evidence suggests that agents will change their strategy based on their success rate (see Literature Reference Nos. 14, 15, and 16). Therefore, across several trials, agents should choose a more aggressive strategy when estimates about group attacks are accurate, and a less aggressive strategy when estimates about group attacks are inaccurate.

(4.2) Neural Agent

Motivated by the work of Krichmar et al. (see Literature Reference Nos. 11 and 12), a neural model was created with three area modules: input, action, and neuromodulatory modules. The architecture of the neural model for the resource allocation task described above according to the principles of the present invention is illustrated in FIG. 1. Application of the present invention in other domains is described in section 4.5.2.

In an input area module 100, PFC Probs module 102 (prefrontal cortex probabilities) registers group attack probability estimates. A non-limiting example of such group attack probability estimates includes 80%, 10%, 5%, and 5%. An ACC Conflict module 104 (Anterior Cingulate Cortex Conflict) registers relatively low conflict for this example. Conflict refers to the competition between possible actions; low conflict refers to little competition (i.e., a winner is clear), and high conflict refers to high competition (i.e., a winner is not clear). For simplicity, these values are shown as binned activations in shaded regions 105. However, as can be appreciated by one skilled in the art, a number of encoding schemes are possible. The present invention uses analog values in its desired implementation. In an action area module 106, the OFC module 108 neurons and ACC neurons 110, each with different degrees of aggressiveness, encode the different strategies. The OFC module 108 neurons and the ACC neurons 110 then project to the dorsolateral PFC (DLPFC) module 112, where a motor schema 114 takes a selected aggressiveness parameter and transforms PFC Probs module 102 into a resource allocation 115. A motor schema 114 is an input/output transformation described at a high level of detail. For this problem, each motor schema 114 takes as input the probabilities in PFC Probs module 102 and an aggressiveness parameter and outputs a resource allocation 115. A high setting of the aggressiveness parameter sharpens PFC Probs module 102 into a resource allocation 115 while a low setting flattens PFC Probs module 102 into a resource allocation 115. A description of how PFC Probs module 102 are transformed into a resource allocation 115 is formally defined below, but several other forms (e.g., threshold rule of Literature Reference No. 32) could serve the same function.

In a neuromodulatory area module 116, the VTA module 118, the RN module 120, the BF.SI module 122, and the BF.MS module 124 represent reward 126, cost 128, and incremental 142 and decremental 144 attentional pathways in that order, respectively. The VTA module 118 is used to register the difference between actual and predicted reward 126, while the RN module 120 is used to register the difference between actual and predicted cost 128. Predicted reward 126 is encoded in weights between the ACC Conflict module 104 and the VTA module 118, while predicted cost 128 is encoded in weights between the ACC Conflict module 104 and the RN module 120. In the model, reward 126 was set as equal to the percentage of troops assigned to the attacking group, while cost 128 was set as equal to the percentage of troops used to defend against other groups. The neuromodulatory effects of the BF.SI module 122 and BF.MS 124 control sharpening and flattening dynamics in the OFC module neurons 108 and the ACC neurons 110, respectively. Diamonds represent corresponding neuromodulatory effects; therefore, unbolded solid line diamonds 130 represent dopaminergic neuromodulation from the VTA, unbolded dashed line diamonds 132 represent serotonergic neuromodulation from the RN module 120, bold solid line diamonds 134 represent cholinergic neuromodulation from the BF.SI (which increments attention), and bold dashed line diamonds 136 represent cholinergic neuromodulation from the BF.MS (which decrements attention). For example, weights between the ACC Conflict module 104 and the OFC module 108 neurons used the dopamine signal from the VTA module 118, as indicated by the unbolded solid line diamond.

Neurons in the PFC region of the input area module 100 held group attack probabilities estimates (i.e., PFC Probs module 102), while neurons in the ACC region of the input area module 100 had a localist representation for the spread of these estimates (i.e., ACC Conflict module 104). For simplicity, a measure of dispersion on PFC Probs module 102 was programmatically calculated, and its value was placed into the ACC Conflict module 104. Spread or dispersion refers to the "peakiness" of a probability distribution. Peaky probability distributions have low spread, while flat probability distributions have high spread. The ACC has long been implicated with several performance monitoring functions, including measuring conflict between different actions or outcomes (see Literature Reference No. 17).

In the present invention, however, the conflict of beliefs, not actions, are measured. Additionally, the conflict of group attack probability estimates are measured, and not the choice between sharpening or flattening group attack probabilities into a resource allocation. If agents had to make a binary choice for resource allocation, as in typical bandit games, this conflict of beliefs would become a conflict of actions. Typically, conflict is measured with Hopfield energy (e.g., see Literature Reference No. 18). However, energy does not differentiate between flat (e.g., 0.25, 0.25, 0.25, 0.25) and peaky (e.g., 1, 0, 0, 0) probability distributions; in both cases it is 1. Normalized entropy was chosen instead, because it differentiates between these two extremes; it measures 1 and 0 bits in that order for these distributions. The formula for normalized entropy as represented in the ACC Conflict module 104 is as follows:

$$h = -\frac{1}{\log_2 N} \sum_i p_i \log_2 p_i \qquad (1)$$

where $p_i$ is the group attack probability estimate for group i within PFC Probs module 102, and N is the total number of groups.

There are two possible strategies in the action area 106, one for PM+ 138 and one for PM− 140. PM+ refers to the strategy that is more aggressive than probability matching (PM), and PM− refers to the strategy that is less aggressive than probability matching as described in section 4.1. Each strategy has a corresponding OFC and ACC component (i.e., the OFC module 108 neurons and the ACC neurons 110), which then compete and project to a final decision layer in the DLPFC module 112, an area of the PFC known to be involved in executive control of actions (e.g., see Literature Reference Nos. 19 and 20). The site of this competition may be the dorsal medial striatum and associated components within the basal ganglia (see Literature Reference No. 21). In this case, it is assumed that the OFC module 108 neurons project to the direct, or go, pathway, and the ACC neurons 110 project to the indirect, or no go, pathway, which aligns with the commonly known functional anatomy of the basal ganglia (see Literature Reference No. 33). The chosen strategy in the DLPFC module 112 takes group attack probability estimates and implements a motor schema 114 to sharpen or flatten this distribution in assigning resources. Sharpening (PM+) refers to making the resource allocation more peaky than the input probabilities while flattening (PM−) refers to making the resource allocation less peaky than the input probabilities. The Power Rule was used to implement this function according to the following:

$$y_i = x_i^\alpha / \Sigma_i x_i^\alpha, \quad (2)$$

where $Y_i$ are troops assigned and $x_i$ are group attack probability estimates (both for group i), and $\alpha$ is a parameter. When $\alpha$ is greater than 1, $x_i$'s are sharpened (i.e., made more peaky) implementing PM+ 138. When $\alpha$ is less than 1, $x_i$'s are flattened (i.e., made less peaky) implementing PM− 140. As $\alpha$ approaches infinity, the power rule implements a winner-take-all competition. Flat distributions are returned when $\alpha$ approaches zero. In the action area 106, the chosen strategy in the DLPFC module 112 is a product of long-term weights in the input area 100 as well as short-term effects from the neuromodulatory area 116. In the neuromodulatory area module 116, the VTA module 118, the RN module 120, the BF.SI module 122, and the BF.MS 124 module were simulated. The activity of these neurons was based on synaptic input from the input area module 100 and the action area module 106 via the OFC module 108 neurons and the ACC neurons 110 via connections 142 (OFC) and 144 (ACC), respectively.

The synaptic connectivity of the network is shown in FIG. 1 and the table 200 in FIG. 2. The table 200 in FIG. 2 illustrates synaptic connections between neural areas of the neural model according to principles of the present invention. Referring to the table 200, The "From" column 202 represents the source of a projection, the "To" column 204 represents the sink of a projection, the "Plasticity" column 206 refers to how these projections are modified in the long term, and the "Phasic Neuromodulation" column 208 refers to whether these projections are modified in the short term. In the "To" column 204, a $^C$ represents lateral competition as implemented by the Power Rule, while an $^I$ represents inhibition. In the "Plasticity" column 206, R in equation (6) below is given for long-term plasticity. As an example, equation 6 for the connection between ACC Conflict and OFC (row 1) would be Reward-VTA. Reward and cost are provided from the external environment. VTA refers to the activity of the VTA neuron, while RN refers to the activity of the RN neuron. For short-term plasticity (STP), e is fixed at 1 except where $^{STP}$ appears. In those cases, equation (5) below creates a pre-synaptic efficacy term to capture short term dynamics. Plasticity refers to long-term increments or decrements in synaptic weights, and phasic neuromodulation refers to short-term increments or decrements of synaptic efficacy.

As in the work of Krichmar et al. (see Literature Reference Nos. 11 and 12), the VTA module 118 was used to drive learning according to differences between actual and expected rewards 126, while the RN module 120 was used to drive learning according to differences between actual and expected costs 128. Predicted reward 126 is encoded in weights between the ACC Conflict module 104 and the VTA module 118. Predicted cost 128 is encoded in weights between the ACC Conflict module 104 and the RN module 120. Actual reward was equal to the percentage of troops assigned to the attacking group, while cost was equal to the percentage of troops used to defend against other groups. For example, given a troop allocation of 90, 10, 0, and 0, with the actual attacker being the first group, reward would be 0.9, while cost would be 0.1. The BF.SI module 122 was driven by an arousal signal from OFC 142 (possibly via the amygdala) which in turn incremented attention, or sharpened, the OFC module 108 neurons as depicted by the bold undashed diamond 134. The BF.MS module 124 was driven by a novelty signal from ACC 144 (possibly via the hippocampus) which in turn decremented attention, or flattened, the ACC neurons 110 as depicted by the bold dashed diamond 136.

The neural activity was simulated by a mean firing rate neuron model according to the following:

$$s_i(t) = \rho_i s_i(t-1) + (1-\rho_i)\left(\frac{1}{1+\exp(-I_i(t)/\tau)}\right) \quad (3)$$

where $s_i$ is a neuron's activation level at time t, $\rho_i$ is a parameter that represents the persistence of a neuron, $I_i$, its input, and $\tau$ a parameter that controls the steepness of its activation function. The input to a neuron was the inner product of pre-synaptic connection strengths and neural activity, multiplied by an optional pre-synaptic efficacy term $e_j$ according to the following:

$$I_i = \Sigma_j e_j w_{ji}(t-1) s_j(t) \quad (4)$$

where $w_{ji}$ was the synaptic weight from neuron j to i at time t−1, and $s_j$ is the pre-synaptic neuron's activation level at time t. $e_j$ was fixed at 1 except in the case of weights between OFC, ACC and their corresponding BF regions to capture exploitation/exploration dynamics based on gain and loss. In those cases, $e_j$ used the short-term plasticity model of Literature Reference No. 22 according to the following:

$$\Delta e_j = r[1-e_j(t)] - ds_j(t)e_j(t) \quad (5)$$

where $e_j$ represents synaptic efficacy at time t, r and d dictate recovery and depletion rates in that order. When the BF.SI (BF.MS) neuron's activation exceeded a threshold, it would trigger sharpening (flattening) in OFC (ACC). For simplicity, the Power Rule (equation 2) was used to implement sharpening and flattening in OFC and ACC and winner-take-all choice in DLPFC where $s_i$ was used in place of $x_i$, and $y_i$ was the new value for $s_i$. Finally, weight updates were performed with the following equation:

$$\Delta w_{ji} = \eta s_j(t) s_i(t) R \quad (6)$$

where $\eta$ is a learning rate, and R, the level of reinforcement, is given in the table 200 of FIG. 2 in the Plasticity column 204. FIG. 3 includes a table 300 that lists parameter values, which will be described in further detail below.

Referring back to FIG. 1, a trial consisted of random group attack probability estimates being generated and placed in to PFC Probs module 102 and their spread being measured in the input area module 100 and placed in the ACC Conflict module 104. Spread or dispersion refers to the "peakiness" of a probability distribution. Activation from the input area module 100 propagated into the action area module 106 and the neuromodulatory area module 116, as indicated by the arrows projecting from the ACC Conflict module 104. After a winning strategy was selected in the action area module 106, the agent output its troop allocations via the motor schema and received feedback. Reward feedback is given to the VTA 126 and cost feedback is given to the RN module 120. This feedback, in turn, updated short-term (i.e., BF neuron activities in the BF.SI module 122 and the BF.MS module 124 as depicted by boxes 142 and 144 which are fed by OFC 134 and ACC 110, respectively) and long-term (i.e., weights involving the VTA module 118 and the RN module 120 as depicted by boxes 126 and 128 which are fed by the environment) dynamics.

In the event that group attack probability estimates were accurate (i.e., the highest group attack probability corresponds to the true attacker), reward from the environment would be higher for PM+ 138 than for PM− 140. In this case, weights between ACC conflict module 104 and the PM+ 132 strategy in the OFC module 108 neurons should increase due to higher than expected reward (FIG. 2, table 200, row 1). Weights between the ACC Conflict module 104 and the VTA module 118 would also move in the same direction (FIG. 2, table 200, row 3). There would be the same trend for weights between PM+ in OFC and DLPFC (FIG. 2, table 200, row 5). Weights between the ACC Conflict module 104 and the PM+ strategy in ACC (FIG. 2, table 200, row 2), the ACC Conflict module 104 and RN (FIG. 2, table 200, row 4), and PM+ in ACC and DLPFC (FIG. 2, table 200, row 8) should decrease due to lower than expected cost. Thus, on correct trials, an aggressive strategy would increment its weights relative to a conservative one, making it more likely to be picked on the next trial. Conversely, on incorrect trials, an aggressive strategy would decrement its weights due to lower than expected reward.

Referring to FIG. 2, weights between OFC and BF.SI, and ACC and BF.MS capture short-term dynamics. In particular, when actual reward exceeds predicted reward (i.e., when correct), OFC's weights to BF.SI increase (table 200, row 7). This causes BF.SI to fire more, which, in turn, engages lateral inhibition within OFC, sharpening its units. This positive feedback loop creates a perseverative or exploitive effect as previously selected strategies continue to be chosen. When incorrect, the ACC's weights to BF.MS increase (table 200, row 10), causing BF.MS to fire more, which, in turn, disengages lateral inhibition within ACC, flattening its units. This leads to an explorative effect by choosing strategies that were previously considered too costly.

Figure 4:
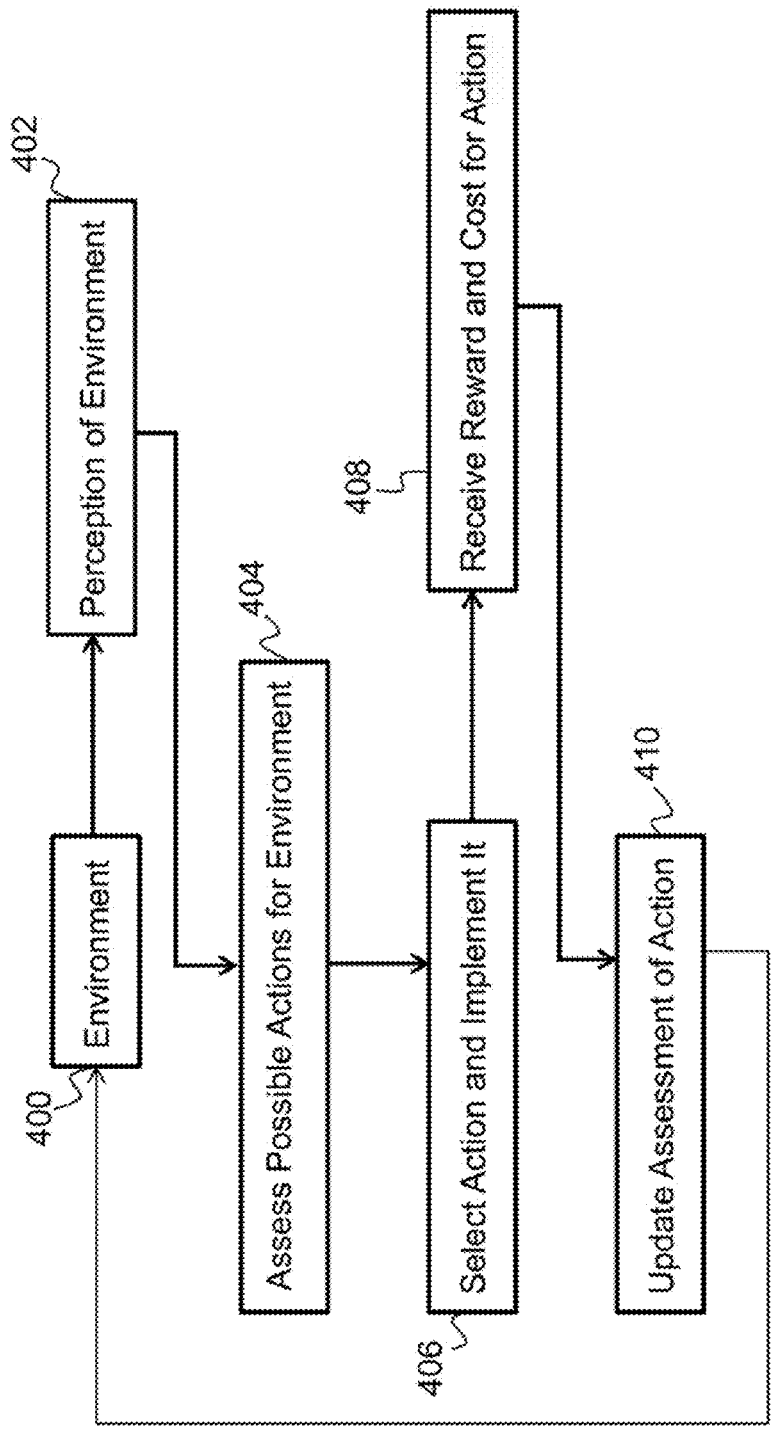
FIG. 4 is a flow diagram of the neural model according to the principles of the present invention.

These steps are illustrated in the flowchart of FIG. 4. An environment 400 (e.g., FIG. 1, PFC Probs module 102) sends out information which provides a perception of the environment 402 (e.g., FIG. 1, the ACC Conflict module 104). Then, the system assesses possible actions for the environment 404. For example, actions are PM+ (FIG. 1, 138) and PM− (FIG. 1, 140) in the OFC module (FIG. 1, 108) and ACC (FIG. 1, 110). Weights between ACC Conflict module (FIG. 1, 104) and the OFC module (FIG. 1, 108), the ACC Conflict module (FIG. 1, 104) and the VTA module (FIG. 1, 118), and between the OFC module (FIG. 1, 108) and the DLPFC module (FIG. 1, 112) reflect the expected reward of an action. Weights between the ACC Conflict module (FIG. 1, 104) and ACC (FIG. 1, 110), the ACC Conflict module (FIG. 1, 104) and the RN module (FIG. 1, 120), and between ACC (FIG. 1, 110) and the DLPFC module (FIG. 1, 112) reflect the expected cost of an action. The BF.SI module (FIG. 1, 122) firing sharpens the OFC module (FIG. 1, 108) units leading to preservation, and the BF.MS module (FIG. 1, 124) firing flattens ACC (FIG. 1, 110) units leading to exploration.

The system then selects an action strategy 406 (e.g., PM+ (FIG. 1, 138) and PM− (FIG. 1, 140) in the DLPFC module (FIG. 1, 112) and implements it with a Motor Schema (FIG. 1, 114)). Thereafter, the system receives a reward and cost for the selected action 408. For example, the percentage of troops assigned to the actual attacking group for reward, or the percentage of troops assigned to groups other than the actual attacking group for cost.

Then, the system updates the assessment of the action 410. Non-limiting examples of assessment updates include the VTA module (FIG. 1, 118) and the RN module (FIG. 1, 120) signals drive long term dynamics; the BF.SI module (FIG. 1, 122) and the BF.MS module (FIG. 1, 124) firing drive short-term dynamics; the VTA module (FIG. 1, 118) is the difference between expected and actual reward; expected reward is dictated by the weight between the ACC Conflict module (FIG. 1, 104) and the VTA module (FIG. 1, 118); the RN module (FIG. 1, 120) is the difference between expected and actual cost, and expected cost is dictated by the weight between the ACC Conflict module (FIG. 1, 104) and the RN module (FIG. 1, 120).

The system then returns back to the environment 400 (e.g., FIG. 1, PFC Probs module 102). Adaptation of the neural model according to the principles of the present invention to other domains is described below.

(4.3) Trials, Simulated Agents, Lesions, and Scenarios

A trial consisted of a set of group attack probability estimates being generated, followed by troop allocation and feedback. Each simulated agent performed 100 consecutive trials. To simulate different subjects, 50 random initial weight sets (i.e., model instances) were used. Each model instance is a copy of the neural model with different random initial weights.

The table 300 of FIG. 3 lists parameters for this initialization process. Selective lesions were performed on neuron populations in the neuromodulatory and action areas, as shown in a table 500 in FIG. 5, by setting the output of those neurons to zero. Setting the output of those neurons to zero effectively removes any affect the neuron might have on the entire network. In FIG. 5, "Y" denotes yes (i.e., a lesion is present), and "N" denotes no (i.e., a lesion is not present). The table depicts lesions made in the various areas of the model, including the OFC, the ACC module, the BF.MS, and the BF.SI. Lesions were made in the various areas to determine the effect on action selection. Lesions can also be used to make predictions of how lesions in actual brains would affect behavior Furthermore, two scenarios were created. In the first scenario, hereinafter referred to as Accurate, the attacking group matched the highest group attack probability estimates 75% of the time while in the second scenario, hereinafter referred to as Inaccurate, it only matched 25% of the time. For example, in the Accurate scenario, given group attack probabilities of 80%, 10%, 5%, 5%, the attacker would be the first group in 75% of the trials and any of the other groups in 25% of the trials. Conversely, in the Inaccurate scenario, the attacker would be the first group in 25% of the trials and any of the other groups in 75% of the trials. A successful agent should pick PM+ more often in the first scenario as group probability attack estimates predict attack perpetrators well, and choose PM− more often in the second scenario because attack estimates do not accurately predict actual attacks.

(4.4) Results (4.4.1) Intact Model

In general, simulated agents were able to choose the strategy that maximized expected reward or stated otherwise, minimized expected cost. In the Accurate scenario, PM+ was used an average of 74% of the time across all trials and all simulated agents. Conversely, in the Inaccurate scenario, PM+ was used 46% of the time, a difference that is statistically significant (Kolmogorov-Smirov test, p<0.05). These results are listed in the table 600 in FIG. 6.

Values in parenthesis are standard deviations. A * represents a statistically significant difference (Kolmogorov-Smirov test, p<0.05) with respect to the control condition. For the control condition, the difference between the Accurate and Inaccurate scenario is also statistically significant.

In terms of short-term dynamics, in the Accurate (Inaccurate) scenario, BF.SI was driven by OFC, which in turn triggered OFC sharpening in an average of 36.7% (0.1%) of trials across all simulated agents. This is because group attack probability estimates were good predictors of attackers and, hence, there was no reason to shift strategies on subsequent trials. This is a perseverative effect across trials. In experimental studies, BF.MS firings were inversely correlated with BF.SI firings—an average of 0.5% (68.7%) of trials across all agents for the Accurate (Inaccurate) scenarios. This corresponds to exploration of new strategies after the simulated agents incurred losses, which was more common in the Inaccurate scenario.

Figure 7:
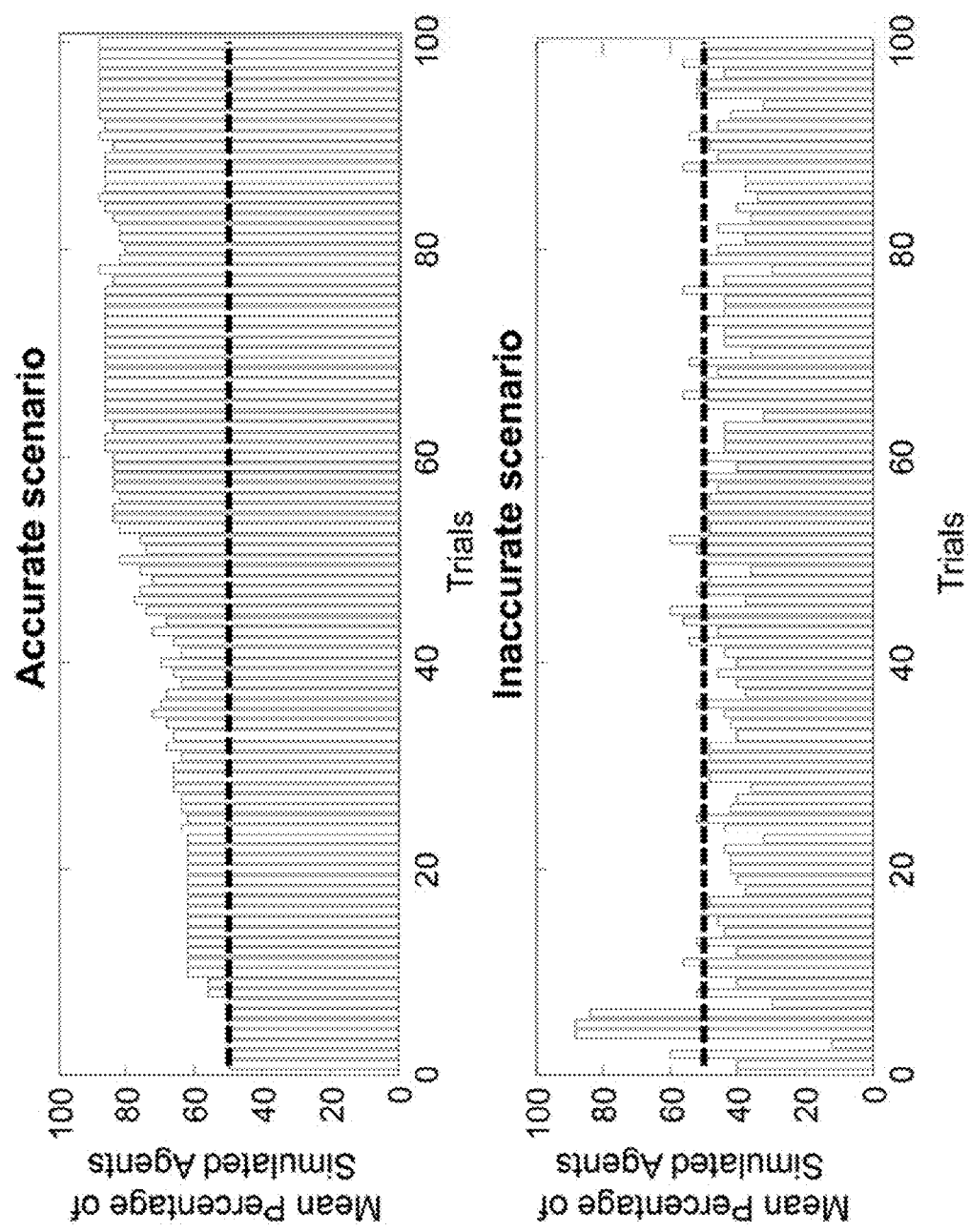
FIG. 7A is a plot of mean percentage of simulated agents choosing PM+ for each trial in the control condition when group probability estimates were accurate according to the principles of the present invention.
FIG. 7B is a plot of mean percentage of simulated agents choosing PM+ for each trial in the control condition when group probability estimates were inaccurate according to the principles of the present invention.

Analyzing per trial choices averaged across all simulated agents showed that the models were indeed learning. For example, in the first 15 trials of either scenario, random behavior was observed across all simulated agents (i.e., roughly 50% percent of choices were PM+). However, as trials continued in the Accurate scenario, more and more aggressive choices were made, ending in an average of 87% of all simulated agents choosing PM+ for the last 15 trials. For the Inaccurate scenario, the number of aggressive choices fell so that 46% of simulated agents choose PM+ for the last 15 trials. These results are illustrated in FIGS. 7A and 7B. FIGS. 7A and 7B illustrate the mean percentage of simulated agents choosing PM+ for each trial in the Control condition. In both scenarios (i.e., accurate group probability estimates and inaccurate group probability estimates), the percentage of agents choosing PM+ in early trials was close to random (the dotted line represents 50%). However, in later trials, simulated agents were more likely to pick PM+ when group probability estimates were accurate (FIG. 7A) than inaccurate (FIG. 7B), as indicated by the increasing mean percentage of simulated agents choosing PM+ in later trials.

(4.4.2) Effects of Lesions

Similar to the findings of Literature Reference Nos. 11 and 12, it was found that OFC (ACC) lesions are functionally similar to lesions of VTA (RN). In other words, OFC (ACC) lesioned simulated agents could not properly assess reward (cost). OFC lesions to simulated agents led to more conservative choices (FIG. 6, table 600, row 2). On the other hand, ACC lesions led to more aggressive choices (FIG. 6, table 600, row 3). For OFC lesioned agents, BF.MS firings were less common in the Accurate scenario (0.64% of trials across all simulated agents) than in the Inaccurate scenario (63.4%). As in the control condition, this demonstrates an exploration of strategies after incurring loss. BF.SI did not fire because there was no OFC to trigger it. For ACC lesioned agents, BF.SI firings were more common in the Accurate scenario (32.5% of trials across all simulated agents) than in the Inaccurate scenario (0.14%), which is also like the control condition. This corresponds to a perseverative effect. BF.MS did not fire because there was no ACC to trigger it.

(4.5) Discussion (4.5.1) Comparison to Other Models

Previous models of action selection with neuromodulatory systems have not extensively considered prefrontal contributions or acetylcholinergic influences to action selection (see Literature Reference Nos. 11 and 12). This makes the invention described herein more applicable to a wider array of tasks as well as having the added ability to capture both short- and long-term dynamics in action selection. These advantages, in turn, make the present invention more relevant to a larger set of application domains requiring models of action selection.

Reinforcement learning and evolutionary algorithms have also been used to model n-arm bandit and resource allocation tasks (e.g., see Literature Reference Nos. 13 and 24) and, hence, action selection in general. However, these models do not have a high degree of neurofidelity and, therefore, cannot make predictions of animal behavior based on lesion studies or neurotransmitter imbalances. Perhaps the most comparable model to the present invention is that of Litt et al. (see Literature Reference No. 25), which seeks to model prospect theory and decision affect theory using brain regions such as OFC, ACC, and dopaminergic and serotoninergic areas. Their model, however, does not model acetylcholinergic influences and has only been demonstrated on binary decisions.

BF.MS lesions decreased sharpening in ACC but did not yield dramatic performance changes due to the stationary nature of each scenario. Similarly, BF.SI lesions had little overall affect in performance. This is because both scenarios are static across trials. A dynamic scenario, for example, would change the accuracy of group probability estimates every 20 trials.

(4.5.2) Adaptation to Other Domains

As can be understood by one skilled in the art, the present invention can be applied to other domains. To do so, the following terms need to be defined:
 1. How the environment is perceived (the ACC Conflict module 104 in FIG. 1)
 2. The set of possible actions and how to implement them (Action units in the OFC module 108, ACC 110, the DLPFC module 112, and motor schema 114 in FIG. 1)
 3. Reward for an action (input into the VTA module 118 in FIG. 1)
 4. Loss for an action (input into the RN module 120 in FIG. 1)

After that, the network structure in FIG. 1, the table 200 of synaptic connections in FIG. 2, and the information flow diagram in FIG. 4 would enable action selection to be modeled.

As a non-limiting application example, consider the Iowa gambling task (see Literature Reference No. 30). Subjects must choose cards across 4 card decks. Cards in each deck will signify either a loss (e.g., -$5) or a gain (e.g., $10). Most card decks are "good," meaning their average payout is greater than 0 (e.g., $10, -$5, $10, -$5, $10, leading to the average payout being $5 across many cards). However, some decks are "bad," meaning their average payout is less than or equal to 0 (e.g., $10, -$5, -$5, -$5, $10, leading to the average payout being -$5 across many cards). In this case, (1) can be 4 neurons each representing each deck each having the same activation (there is no need to otherwise "perceive" each deck), (2) can be selecting each deck, (3) can be the gain received from each card, and (4) can be the loss received from each card. Over time, "good" decks would increment their weights relative to "bad" decks, making them more likely to be picked on the next trial. Also, when actual reward exceeds predicted reward, OFC weights to BF.SI increase (FIG. 2, row 7), causing BF.SI to fire more, which sharpens OFC units. This creates a perseverative or exploitive effect. When incorrect, ACC weights to BF. MS increase (FIG. 2, row 10), causing BF.MS to fire more, which flattens ACC. This leads to an explorative effect by choosing decks that were previously considered too costly.

By changing the balance of neurotransmitters, behavior in atypical populations, such as suicide attempters (see Literature Reference Nos. 28 and 29), can also be modeled.

Additional non-limiting applications of the invention described herein include action selection for autonomous vehicles or robots, and simulation of action selection in other agents for use by autonomous vehicles or robots. The autonomous robot (which could include an autonomous vehicle) would comprise a plurality of actuators (e.g., motors, tactile actuators (fingers, hands), camera) for implementing a selected action as well as one or more processors for executing instructions to select an action based on a combination of neuromodulatory and prefrontal cortex area models.

Furthermore, non-limiting applications include modeling consumer action selection (e.g., which car to purchase) and modeling adversarial action selection (e.g., electronic warfare). Additionally, the model according to the principles of the present invention can be used to design environments that agents interact with, allowing the prediction of agent behaviors with different environmental statistics (payoff and cost/risk probabilities). The model simulates how much of the environment of the agent will explore using different action selections.

Figure 8:
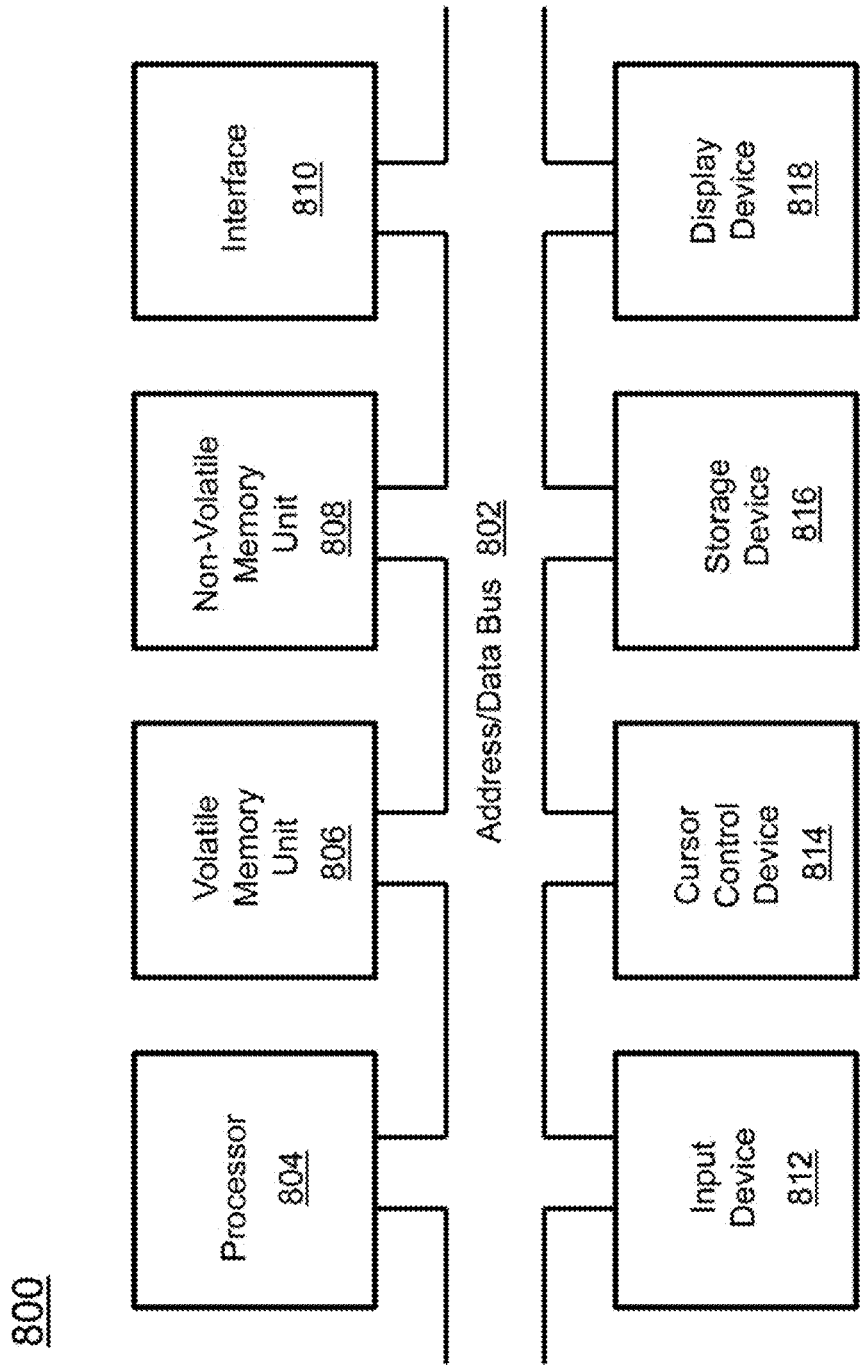
FIG. 8 is an illustration of a data processing system according to the present invention.

An example of a computer system 800 in accordance with one aspect is shown in FIG. 8. The computer system 800 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 800. When executed, the instructions cause the computer system 800 to perform specific actions and exhibit specific behavior, such as described herein.

The computer system 800 may include an address/data bus 802 that is configured to communicate information. Additionally, one or more data processing units, such as a processor 804, are coupled with the address/data bus 802. The processor 804 is configured to process information and instructions. In one aspect, the processor 804 is a microprocessor. Alternatively, the processor 804 may be a different type of processor such as a parallel processor, or a field programmable gate array.

The computer system 800 is configured to utilize one or more data storage units. The computer system 800 may include a volatile memory unit 806 (e.g., random access memory ("RAM"), static RAM, dynamic RAM, etc.) coupled with the address/data bus 802, wherein a volatile memory unit 806 is configured to store information and instructions for the processor 804. The computer system 800 further may include a non-volatile memory unit 808 (e.g., read-only memory ("ROM"), programmable ROM ("PROM"), erasable programmable ROM ("EPROM"), electrically erasable programmable ROM "EEPROM"), flash memory, etc.) coupled with the address/data bus 802, wherein the non-volatile memory unit 808 is configured to store static information and instructions for the processor 804. Alternatively, the computer system 800 may execute instructions retrieved from an online data storage unit such as in "Cloud" computing. In an embodiment, the computer system 800 also may include one or more interfaces, such as an interface 810, coupled with the address/data bus 802. The one or more interfaces are configured to enable the computer system 800 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 800 may include an input device 812 coupled with the address/data bus 802, wherein the input device 812 is configured to communicate information and command selections to the processor 800. In accordance with one aspect, the input device 812 is an alphanumeric input device, such as a keyboard, that may include alphanumeric and/or function keys. Alternatively, the input device 812 may be an input device other than an alphanumeric input device. In one aspect, the computer system 800 may include a cursor control device 814 coupled with the address/data bus 802, wherein the cursor control device 814 is configured to communicate user input information and/or command selections to the processor 800. In one aspect, the cursor control device 814 is implemented using a device such as a mouse, a track-ball, a track-pad, an optical tracking device, or a touch screen. The foregoing notwithstanding, in one aspect, the cursor control device 814 is directed and/or activated via input from the input device 812, such as in response to the use of special keys and key sequence commands associated with the input device 812. In an alternative aspect, the cursor control device 814 is configured to be directed or guided by voice commands.

In one aspect, the computer system 800 further may include one or more optional computer usable data storage devices, such as a storage device 816, coupled with the address/data bus 802. The storage device 816 is configured to store information and/or computer executable instructions. In one aspect, the storage device 816 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 818 is coupled with the address/data bus 802, wherein the display device 818 is configured to display video and/or graphics. In one aspect, the display device 818 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 800 presented herein is an example computing environment in accordance with one aspect. However, the non-limiting example of the computer system 800 is not strictly limited to being a computer system. For example, one aspect provides that the computer system 800 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 9:
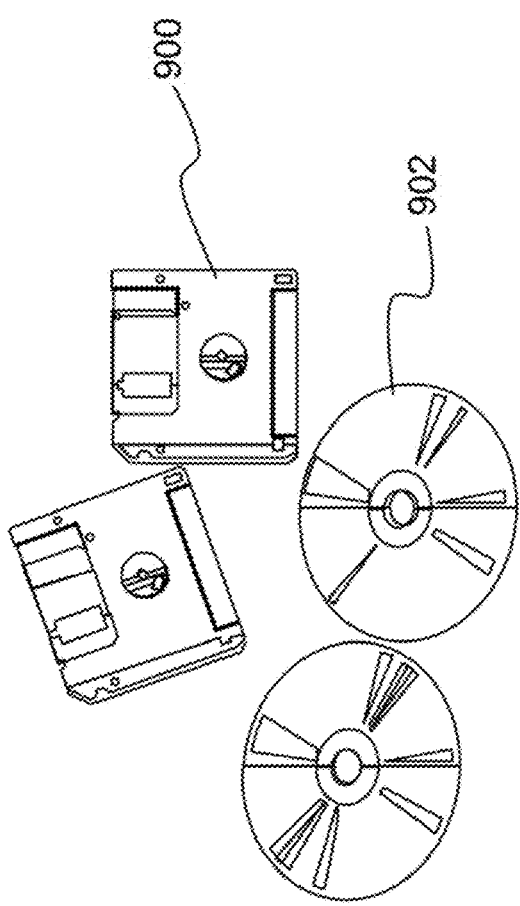
FIG. 9 is an illustration of a computer program product according to the present invention.

An illustrative diagram of a computer program product embodying the present invention is depicted in FIG. 9. As a non-limiting example, the computer program product is depicted as either a floppy disk 900 or an optical disk 902. However, as mentioned previously, the computer program product generally represents computer readable code (i.e., instruction means or instructions) stored on any compatible non-transitory computer readable medium.

Figure 10:
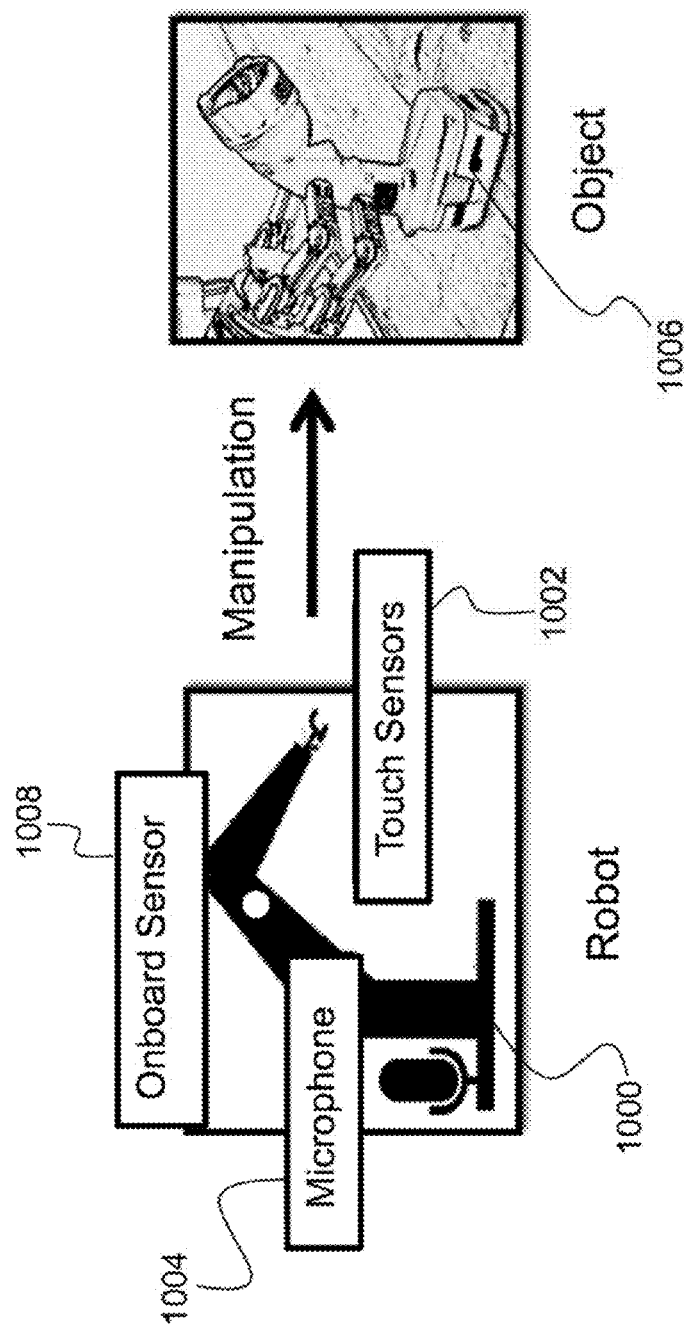
FIG. 10 is an illustration of an autonomous robot according to the present invention.

FIG. 10 is an illustration of an autonomous robot 1000 according to the principles of the present invention. The autonomous robot 1000 (which could include an autonomous vehicle) comprises a plurality of actuators (e.g., motors, tactile actuators (fingers having touch sensors 1002), microphone 1004)) for implementing a selected action (such as manipulation of an object 1006). Additionally, the autonomous robot 1000 may comprise at least one onboard sensor 1008 which is operable for sensing a current environment and the object 1006. The onboard sensor 1008 may be a camera, video camera, thermal imaging sensor, or infrared sensor.

What is claimed is:

1. A system for action selection using a combination of neuromodulatory and prefrontal cortex area models, the system comprising:
  one or more processors and a non-transitory memory having instructions encoded thereon such that when the instructions are executed, the one or more processors perform operations of:
    generating a model instance of a neural model having an action area module and a neuromodulatory area module;
    inputting, in a prefrontal cortex (PFC) input area module of the model instance, a set of group attack probability estimates for a plurality of groups;
    encoding, in an anterior cingulate cortex (ACC) conflict input area module of the model instance, a spread or dispersion of the group attack probability estimates, resulting in an activation of the ACC conflict input area module;
    propagating the activation of the ACC conflict input area module to the action area module of the model instance and the neuromodulatory area module of the model instance;
    selecting an action strategy in the action area module of the model instance;
    implementing the action strategy;
    generating a reward and a cost for the implemented action strategy; and
    updating an assessment of possible action strategies based on the generated reward and cost for the implemented action strategy;
    wherein each model instance of the neural model modulates its subsequent action strategy selection based on the updated assessment of the possible action strategies.

2. The system as set forth in claim 1, wherein the one or more processors further perform an operation of encoding the spread or dispersion of group attack probability estimates according to the following:

$$h = -\frac{1}{\log_2 N}\sum_i p_i \log_2 p_i,$$

where h represents normalized entropy, $p_i$ is a group attack probability estimate for group i, and N is the total number of groups.

3. The system as set forth in claim 2, wherein the propagation of the activation of the ACC conflict input area module to the action area module of the model instance and the neuromodulatory area module of the model instance is governed by synaptic weights.

4. The system as set forth in claim 3, wherein the selection of an action strategy in the action area module of the model instance is based on a product of a set of long-terms weights from the ACC conflict input area module and a set of short-term effects from the neuromodulatory area module of the model instance.

5. The system as set forth in claim 4, wherein the action strategy is implemented using the Power Rule according to the following:

$$y_i = x_i^\alpha / \Sigma_i x_i^\alpha,$$

where $y_i$ is a set of troop units assigned for group i, $x_i$ represents group attack probability estimates for group i, and $\alpha$ is a parameter, such that when $\alpha$ is greater than 1, an aggressive strategy is implemented, and when $\alpha$ is less than 1, a conservative strategy is implemented.

6. The system as set forth in claim 5, wherein the one or more processors further perform an operation of generating the reward as a percent of resources assigned to a true attacking group, and generating the cost as a percent of resources not assigned to the true attacking group.

7. The system as set forth in claim 6, wherein each model instance modulates its subsequent action strategy selection to prefer a more aggressive action strategy when the set of group attack probability estimates are accurate, and wherein each model instance modulates its subsequent action strategy selection to prefer a less aggressive action strategy when the set of group attack probability estimates are inaccurate.

8. The system as set forth in claim 7, wherein the action area module of the model instance comprises an orbitofrontal cortex (OFC) neuron module, an ACC neuron module, and a dorsolateral PFC (DLPFC) module, wherein the OFC neuron module and the ACC neuron module each encode different action strategies having different levels of aggressiveness, and wherein the OFC neuron module and the ACC neuron module project to the DLPFC module where the action strategy is selected.

9. The system as set forth in claim 8, wherein the neuromodulatory area module of the model instance comprises a ventral tegmental neuron module (VTA), a raphe nucleus (RN) neuron module, a basal forebrain substantia innominata (BF.SI) neuron module, and a basal forebrain medial septum (BF.MS) neuron module, wherein these modules encode reward, cost, decremental attention, and incremental attention, respectively.

10. A computer-implemented method for action selection using a combination of neuromodulatory and prefrontal cortex area models, comprising:
  an act of causing one or more processors to execute instructions stored on a non-transitory memory such that upon execution, the data processor performs operations of:
    generating a model instance of a neural model having an action area module and a neuromodulatory area module;
    inputting, in a prefrontal cortex (PFC) input area module of the model instance, a set of group attack probability estimates for a plurality of groups;

encoding, in an anterior cingulate cortex (ACC) conflict input area module of the model instance, a spread or dispersion of the group attack probability estimates, resulting in an activation of the ACC conflict input area module;

propagating the activation of the ACC conflict input area module to the action area module of the model instance and the neuromodulatory area module of the model instance;

selecting an action strategy in the action area module of the model instance;

implementing the action strategy;

generating a reward and a cost for the implemented action strategy; and updating an assessment of possible action strategies based on the generated reward and cost for the implemented action strategy;

wherein each model instance of the neural model modulates its subsequent action strategy selection based on the updated assessment of the possible action strategies.

11. The method as set forth in claim 10, wherein the one or processors further performs an operation of encoding the spread or dispersion of group attack probability estimates according to the following:

$$h = -\frac{1}{\log_2 N} \sum_i p_i \log_2 p_i,$$

where h represents normalized entropy, $p_i$ is a group attack probability estimate for group i, and N is the total number of groups.

12. The method as set forth in claim 11, wherein the propagation of the activation of the ACC conflict input area module to the action area module of the model instance and the neuromodulatory area module of the model instance is governed by synaptic weights.

13. The method as set forth in claim 12, wherein the selection of an action strategy in the action area module of the model instance is based on a product of a set of long-terms weights from the ACC conflict input area module and a set of short-term effects from the neuromodulatory area module of the model instance.

14. The method as set forth in claim 13, wherein the action strategy is implemented using the Power Rule according to the following:

$$y_i = x_i^\alpha / \Sigma_i x_i^\alpha,$$

where $y_i$ is a set of troop units assigned for group i, $x_i$ represents group attack probability estimates for group i, and $\alpha$ is a parameter, such that when $\alpha$ is greater than 1, an aggressive strategy is implemented, and when $\alpha$ is less than 1, a conservative strategy is implemented.

15. The method as set forth in claim 14, wherein the one or more processors further perform an operation of generating the reward as a percent of resources assigned to a true attacking group, and generating the cost as a percent of resources not assigned to the true attacking group.

16. The method as set forth in claim 15, wherein each model instance modulates its subsequent action strategy selection to prefer a more aggressive action strategy when the set of group attack probability estimates are accurate, and wherein each model instance modulates its subsequent action strategy selection to prefer a less aggressive action strategy when the set of group attack probability estimates are inaccurate.

17. The method as set forth in claim 16, wherein the action area module of the model instance comprises an orbitofrontal cortex (OFC) neuron module, an ACC neuron module, and a dorsolateral PFC (DLPFC) module, wherein the OFC neuron module and the ACC neuron module each encode different action strategies having different levels of aggressiveness, and wherein the OFC neuron module and the ACC neuron module project to the DLPFC module where the action strategy is selected.

18. The method as set forth in claim 17, wherein the neuromodulatory area module of the model instance comprises a ventral tegmental neuron module (VTA), a raphe nucleus (RN) neuron module, a basal forebrain substantia innominata (BF.SI) neuron module, and a basal forebrain medial septum (BF.MS) neuron module, wherein these modules encode reward, cost, decremental attention, and incremental attention, respectively.

19. A computer program product for action selection using a combination of neuromodulatory and prefrontal cortex area models, the computer program product comprising computer-readable instructions stored on a non-transitory computer-readable medium that are executable by a computer having a processor for causing the processor to perform operations of:

generating a model instance of a neural model having an action area module and a neuromodulatory area module;

inputting, in a prefrontal cortex (PFC) input area module of the model instance, a set of group attack probability estimates for a plurality of groups;

encoding, in an anterior cingulate cortex (ACC) conflict input area module of the model instance, a spread or dispersion of the group attack probability estimates, resulting in an activation of the ACC conflict input area module;

propagating the activation of the ACC conflict input area module to the action area module of the model instance and the neuromodulatory area module of the model instance;

selecting an action strategy in the action area module of the model instance;

implementing the action strategy;

generating a reward and a cost for the implemented action strategy; and updating an assessment of possible action strategies based on the generated reward and cost for the implemented action strategy;

wherein each model instance of the neural model modulates its subsequent action strategy selection based on the updated assessment of the possible action strategies.

20. The computer program product as set forth in claim 19, further comprising instructions for causing the processor to perform an operation of:

encoding the spread or dispersion of group attack probability estimates according to the following:

$$h = -\frac{1}{\log_2 N} \sum_i p_i \log_2 p_i,$$

where h represents normalized entropy, $p_i$ is a group attack probability estimate for group i, and N is the total number of groups.

21. The computer program product as set forth in claim 20, wherein the propagation of the activation of the ACC conflict input area module to the action area module of the model instance and the neuromodulatory area module of the model instance is governed by synaptic weights.

22. The computer program product as set forth in claim 21, wherein the selection of an action strategy in the action area module of the model instance is based on a product of a set of long-terms weights from the ACC conflict input area module and a set of short-term effects from the neuromodulatory area module of the model instance.

23. The computer program product as set forth in claim 22, wherein the action strategy is implemented using the Power Rule according to the following:

$$y_i = x_i^\alpha / \Sigma_i x_i^\alpha,$$

where $y_i$ is a set of troop units assigned for group i, $x_i$ represents group attack probability estimates for group i, and $\alpha$ is a parameter, such that when $\alpha$ is greater than 1, an aggressive strategy is implemented, and when $\alpha$ is less than 1, a conservative strategy is implemented.

24. The computer program product as set forth in claim 23, wherein the one or more processors further perform an operation of generating the reward as a percent of resources assigned to a true attacking group, and generating the cost as a percent of resources not assigned to the true attacking group.

25. The computer program product as set forth in claim 24, wherein each model instance modulates its subsequent action strategy selection to prefer a more aggressive action strategy when the set of group attack probability estimates are accurate, and wherein each model instance modulates its subsequent action strategy selection to prefer a less aggressive action strategy when the set of group attack probability estimates are inaccurate.

26. The computer program product as set forth in claim 25, wherein the action area module of the model instance comprises an orbitofrontal cortex (OFC) neuron module, an ACC neuron module, and a dorsolateral PFC (DLPFC) module, wherein the OFC neuron module and the ACC neuron module each encode different action strategies having different levels of aggressiveness, and wherein the OFC neuron module and the ACC neuron module project to the DLPFC module where the action strategy is selected.

27. The computer program product as set forth in claim 26, wherein the neuromodulatory area module of the model instance comprises a ventral tegmental neuron module (VTA), a raphe nucleus (RN) neuron module, a basal forebrain substantia innominata (BF.SI) neuron module, and a basal forebrain medial septum (BF.MS) neuron module, wherein these modules encode reward, cost, decremental attention, and incremental attention, respectively.

28. An autonomous robot for action selection using a combination of neuromodulatory and prefrontal cortex area models, the system comprising:

a plurality of actuators for implementing an action; and one or more processors and a non-transitory memory having instructions encoded thereon such that when the instructions are executed, the one or more processors perform operations of:

generating a model instance of a neural model having an action area module and a neuromodulatory area module;

inputting, in a prefrontal cortex (PFC) input area module of the model instance, a set of group attack probability estimates for a plurality of groups;

encoding, in an anterior cingulate cortex (ACC) conflict input area module of the model instance, a spread or dispersion of the group attack probability estimates, resulting in an activation of the ACC conflict input area module;

propagating the activation of the ACC conflict input area module to the action area module of the model instance and the neuromodulatory area module of the model instance;

selecting an action strategy in the action area module of the model instance;

implementing of the action strategy by the autonomous robot;

generating a reward and a cost for the implemented action strategy; and updating an assessment of possible action strategies based on the generated reward and cost for the implemented action strategy;

wherein each model instance of the neural model modulates its subsequent action strategy selection based on the updated assessment of the possible action strategies.

* * * * *